US011270592B2

(12) United States Patent
Emura et al.

(10) Patent No.: US 11,270,592 B2
(45) Date of Patent: Mar. 8, 2022

(54) VEHICLE CONTROL DEVICE, METHOD FOR CONTROL OF VEHICLE, AND PROGRAM FOR CONTROL OF VEHICLE CONTROL DEVICE

(71) Applicant: NEC Corporation, Tokyo (JP)

(72) Inventors: Masafumi Emura, Tokyo (JP); Masatsugu Ogawa, Tokyo (JP); Masumi Ichien, Tokyo (JP)

(73) Assignee: NEC CORPORATION, Tokyo (JP)

(*) Notice: Subject to any disclaimer, the term of this patent is extended or adjusted under 35 U.S.C. 154(b) by 450 days.

(21) Appl. No.: 16/468,335

(22) PCT Filed: Dec. 13, 2017

(86) PCT No.: PCT/JP2017/044646
§ 371 (c)(1),
(2) Date: Jun. 11, 2019

(87) PCT Pub. No.: WO2018/116919
PCT Pub. Date: Jun. 28, 2018

(65) Prior Publication Data
US 2020/0090522 A1   Mar. 19, 2020

(30) Foreign Application Priority Data
Dec. 20, 2016 (JP) .............................. JP2016-246187

(51) Int. Cl.
*G08G 3/00* (2006.01)
*B63G 8/00* (2006.01)
(Continued)

(52) U.S. Cl.
CPC ............... *G08G 3/00* (2013.01); *B63G 8/001* (2013.01); *G01S 15/89* (2013.01); *G05D 1/0088* (2013.01);
(Continued)

(58) Field of Classification Search
CPC .... G08G 3/00; B63G 8/001; B63G 2008/004; G01S 15/89; G05D 1/0088; G05D 1/0206;
(Continued)

(56) References Cited

U.S. PATENT DOCUMENTS 7,409,266 B2 * 8/2008 Hara ..................... B64C 33/025
700/245
8,260,485 B1 * 9/2012 Meuth .................... G06Q 10/04
701/26
(Continued)

FOREIGN PATENT DOCUMENTS

JP    2003-107151 A    4/2003
JP    2003-145469 A    5/2003
(Continued)

OTHER PUBLICATIONS

Ousingsawat et al., Optimal Cooperative Reconnaissance Using Multiple Vehicles, Jan.-Feb. 2007, Journal of Guidance, Control, And Dynamics, vol. 30, No. 1, pp. 122-132 (Year: 2007).*
(Continued)

*Primary Examiner* — Sze-Hon Kong
(74) *Attorney, Agent, or Firm* — Sughrue Mion, PLLC

(57) ABSTRACT

A control method of a vehicle, comprising: estimating an environment model relating to a search region, based on environment information acquired by an environment sensor, wherein the environment sensor acquires the environment information representing an environment around a local vehicle among one or more vehicles; estimating an effective range based on the estimated environment model, when the local vehicle, and each vehicle among the one or more vehicles move to each candidate destination; and configuring a plurality of sets being configurable by the candidate destinations of all the vehicles, determining, based on the estimated effective range, a certain set, among the
(Continued)

plurality of sets, by which an entire size demarcated by the effective range in one set among the plurality of sets becomes maximum.

20 Claims, 19 Drawing Sheets

(51) Int. Cl.
  *G01S 15/89* (2006.01)
  *G05D 1/00* (2006.01)
  *G05D 1/02* (2020.01)
  *H04L 67/12* (2022.01)

(52) U.S. Cl.
  CPC ........ *G05D 1/0206* (2013.01); *B63B 2211/00* (2013.01); *B63G 2008/004* (2013.01); *H04L 67/12* (2013.01)

(58) Field of Classification Search
  CPC ............... G05D 1/0219; G05D 1/0291; G05D 2201/0207; G05D 1/00; B63B 2211/00; B63B 49/00; H04L 67/12; B63C 11/00
  See application file for complete search history.

(56) References Cited

U.S. PATENT DOCUMENTS

| | | | | |
|---|---|---|---|---|
| 8,751,043 | B2* | 6/2014 | Guo | G05D 1/0274 700/248 |
| 9,151,858 | B2* | 10/2015 | Hovstein | G01V 1/3808 |
| 2003/0105534 | A1* | 6/2003 | Hara | B25J 9/1682 700/2 |
| 2006/0085106 | A1 | 4/2006 | Gaudiano et al. | |
| 2016/0147223 | A1* | 5/2016 | Edwards | B63C 7/003 701/2 |
| 2016/0266246 | A1* | 9/2016 | Hjelmstad | G01S 15/86 |
| 2018/0306916 | A1* | 10/2018 | Kronander | G01S 7/003 |

FOREIGN PATENT DOCUMENTS

| | | |
|---|---|---|
| JP | 2006-344075 A | 12/2006 |
| JP | 2012-145346 A | 8/2012 |
| JP | 2016-157464 A | 9/2016 |
| WO | 2016/166983 A1 | 10/2016 |

OTHER PUBLICATIONS

Yan et al., Area Coverage Searching for Swarm Robots Using Dynamic Voronoi-based Method, Jul. 28-30, 2015, Proceedings of the 34th Chinese Control Conference, Hangzhou, China, pp. 6090-6094 (Year: 2015).*
Edwards et al., A Leader-Follower Algorithm for Multiple AUV Formations, 2004 IEEE/OES Autonomous Underwater Vehicles, pp. 40-46 (Year: 2004).*
Yu et al., Multi-AUV Based Cooperative Observations, 2004 IEEE/OES Autonomous Underwater Vehicles, pp. 7-13 (Year: 2004).*
Cortés et al., "Coverage control for mobile sensing networks", Robotics and Automation, 2002. Proceedings. ICRA'02. IEEE International Conference on. vol. 2. IEEE, 2002, pp. 1-14.
Pimenta et al. "Sensing and Coverage for a Network of Heterogeneous Robots," 47th IEEE Conference on Decision and Control, IEEE, Dec. 9-11, 2008, pp. 3947-3952 (total 6 pages).
International Search Report for PCT/JP2017/044646 dated Mar. 6, 2018.
Written Opinion for PCT/JP2017/044646 dated Mar. 6, 2018.
Extended European Search Report for EP Application No. EP17884013.8 dated Oct. 31, 2019.
Kelli A. C. Baumgartner et al.: "Optimal Control of an Underwater Sensor Network for Cooperative Target Tracking", IEEE Journal of Oceanic Engineering, IEEE Service Center, Piscataway, NJ, US, vol. 34, No. 4, Oct. 4, 2009 (Oct. 4, 2009), pp. 678-697.
Enric Galceran et al.: "A survey on coverage path planning for robotics", Robotics and Autonomous Systems, vol. 61, No. 12, Sep. 20, 2013 (Sep. 20, 2013), pp. 1258-1276, Spain.
Yang Lyu et al.: "Simultaneously multi-UAV mapping and control with visual servoing", 2015 International Conference on Unmanned Aircraft Systems (ICUAS), IEEE, Jun. 9, 2015 (Jun. 9, 2015), pp. 125-131, USA.
Phillip J Jones: "Cooperative Area Surveillance Strategies Using Multiple Unmanned Systems", Jun. 30, 2009 (Jun. 30, 2009). USA.

* cited by examiner

Fig.11

| CANDIDATE DESTINATION | P | Q | P | Q | TOTAL |
|---|---|---|---|---|---|
| VEHICLE | x | x | y | y | |
| EFFECTIVE RANGE | xP | xQ | yP | yQ | |
| SIZE 1 | 50 | | | 60 | 110 |
| SIZE 2 | | 100 | 30 | | 130 |

Fig.14

| CANDIDATE DESTINATION | P | Q | P | Q | TOTAL |
|---|---|---|---|---|---|
| VEHICLE | x | x | y | y | |
| EFFECTIVE RANGE | xP | xQ | yP | yQ | |
| OBJECT DETECTION INFORMATION 1 | 45 | | | 30 | 75 |
| OBJECT DETECTION INFORMATION 2 | | 40 | 30 | | 70 |

Fig.17

| CANDIDATE DESTINATION | P | Q | P | Q | TOTAL |
|---|---|---|---|---|---|
| VEHICLE | x | x | y | y | |
| EFFECTIVE RANGE | xP | xQ | yP | yQ | |
| SIZE 1 | 50 | | | 60 | 110 |
| SIZE 2 | | 100 | 30 | | 130 |
| SEARCH EFFICIENCY 1 | 5.3 | | | 5.3 | 10.6 |
| SEARCH EFFICIENCY 2 | | 18.5 | 3.9 | | 22.4 |

Fig.18

| DISTANCE | P | Q |
|---|---|---|
| x | 9.4 | 5.4 |
| y | 7.6 | 11.4 |

Fig.19

| CANDIDATE DESTINATION | P | Q | P | Q | TOTAL |
|---|---|---|---|---|---|
| VEHICLE | x | x | y | y | |
| EFFECTIVE RANGE | xP | xQ | yP | yQ | |
| OBJECT DETECTION INFORMATION 1 | 45 | | | 30 | 75 |
| OBJECT DETECTION INFORMATION 2 | | 40 | 30 | | 70 |
| SEARCH EFFICIENCY 1 | 4.8 | | | 2.6 | 7.4 |
| SEARCH EFFICIENCY 2 | | 7.4 | 3.9 | | 11.3 |

VEHICLE CONTROL DEVICE, METHOD FOR CONTROL OF VEHICLE, AND PROGRAM FOR CONTROL OF VEHICLE CONTROL DEVICE

This application is a National Stage Entry of PCT/JP2017/044646 filed on Dec. 13, 2017, which claims priority from Japanese Patent Application 2016-246187 filed on Dec. 20, 2016, the contents of all of which are incorporated herein by reference, in their entirety.

TECHNICAL FIELD

The present invention relates to a technology for searching for an object by moving, to a search region, vehicles having a search sensor an effective range of which depends on an environment.

BACKGROUND ART

In recent years, various systems using unmanned vehicles have been developed. While many systems using remotely manipulated unmanned vehicles exist, a system using autonomously moving unmanned vehicles also exists.

One example of a system using an autonomously moving unmanned vehicle is disclosed in PTL 1. In the system in PTL 1, a robot autonomously moves within a predetermined range without needing remote manipulation.

A system which performs sensing by a sensor mounted on an unmanned vehicle is also developed.

One example of a system which performs sensing by a sensor mounted on an unmanned vehicle is disclosed in PTL 2. In the system in PTL 2, a detection device mounted on an unmanned aerial vehicle moves close to a target (object), and executes sensing on the target. The unmanned aerial vehicle is remotely manipulated by a manipulator.

Among sensors utilized for sensing, there is a sensor an effective range of which is narrower than a target range of sensing. In this case, by deploying (arranging) a plurality of sensors in a target range, the target range is covered by the plurality of sensors. In the system in PTL 2, in order to cover a target range by a plurality of sensors, it is necessary to remotely manipulate a plurality of unmanned aerial vehicles by a plurality of manipulators. In other words, the system in PTL 2 has a problem that manpower by a plurality of manipulators is required for remote manipulation when a target range is covered by a plurality of sensors.

One example of a technology for covering a target range by a plurality of sensors is disclosed in PTL 3. A search system in PTL 3 includes a plurality of sensor devices, and a coverage control device. A sensor device of the plurality of sensor devices includes a sensor unit, a sensor position output means, a transmission means, a reception means, and a coverage control means. The sensor unit detects object information. The sensor position output means outputs position information of the sensor device. The transmission means transmits the object information and the position information to the coverage control device. The reception means receives a coverage designation for the sensor device from the coverage control device. The coverage control means controls a coverage of the sensor device, based on a received coverage designation. The coverage control device includes an intensively monitored range input means, a topographic information database, a reception means, a coverage calculation means, and a transmission means. The intensively monitored range input means accepts an input of a range to be intensively monitored by a sensor device. The topographic information database stores topographic information. The reception means receives, from a sensor device, object information of each sensor device and position information of each sensor device. The coverage calculation means determines a coverage designation for each sensor device, based on an input range to be intensively monitored, previously stored sensor capability of each sensor device, object information of each sensor device, position information of each sensor device, and topographic information. In this instance, the coverage calculation means determines the coverage designation in such a way that there exists no blind spot of a coverage that is not monitored by any sensor device within a range to be intensively monitored. The transmission means transmits a coverage designation for each sensor device to each sensor device. As a result of the above-described configuration, the search system in PTL 3 controls coverages of distributedly arranged sensor devices.

Another example of a technology for covering a target range by a plurality of sensors is disclosed in NPL 1. In the technology in NPL 1, a plurality of nodes autonomously move in such a way as to take charge of parts of a given range different from one another. However, in the technology in NPL 1, effective ranges of sensors in all nodes are the same.

Still another example of a technology for covering a target range by a plurality of sensors is disclosed in NPL 2. In the technology in NPL 2, when an effective range of a sensor differs from node to node, control of arranging each node is performed. However, an effective range of a sensor in each node does not change depending on a position of a sensor, a time, or the like, and is constant.

CITATION LIST

Patent Literature

[PTL 1] Japanese Unexamined Patent Application Publication No. 2016-157464
[PTL 2] Japanese Unexamined Patent Application Publication No. 2012-145346
[PTL 3] Japanese Unexamined Patent Application Publication No. 2003-107151

NON PATENT LITERATURE

[NPL 1] Cortes, Jorge, et al. "Coverage control for mobile sensing networks." Robotics and Automation, 2002. Proceedings. ICRA'02. IEEE International Conference on. Vol. 2. IEEE, 2002.
[NPL 2] Pimenta, Luciano C A, et al. "Sensing and coverage for a network of heterogeneous robots." Decision and Control, 2008. CDC 2008. 47th IEEE Conference on. IEEE, 2008.

SUMMARY OF INVENTION

Technical Problem

The system in PTL 3 needs a coverage control device which centralizedly controls each sensor device. In other words, the system in PTL 3 has a problem that cost for the coverage control device is needed in addition to cost for the sensor devices.

For example, in a natural environment such as a submarine, marine, land, or atmospheric environment, an effective range of a sensor changes depending on the surrounding environment, when sensing is performed by use of a sensor, such as a sonar, a radar, or a camera, being easily affected by the surrounding environment.

The technology in NPL 1 has a problem that, when an effective range of each sensor is different, a destination of each sensor cannot be determined depending on an effective range of each sensor.

The technology in NPL 2 has a problem that, when an effective range of each sensor differs depending on an environment, a destination of each sensor cannot be determined depending on an effective range of a sensor differing from environment to environment.

The present invention has been made in view of the above-described problems, and a main objective thereof is to, even when an effective range of a search sensor depends on an environment around the search sensor, control in such a way that each of vehicles mounted with the search sensor autonomously moves to a site where an object can be more effectively searched for.

Solution to Problem

In one aspect of the invention, a vehicle control device includes:

environment estimation means for estimating an environment model relating to a search region, based on environment information acquired by an environment sensor, wherein the environment sensor acquires the environment information representing an environment around a local vehicle among one or more vehicles, and the environment sensor is provided in the local vehicle;

coverage estimation means for estimating an effective range based on the environment model estimated by the environment estimation means, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor is provided in each vehicle of the one or more vehicles; and autonomous control means for configuring a plurality of sets being configurable by the candidate destinations, which are different from one another, of all the vehicles, determining, based on the effective range estimated by the coverage estimation means, a certain set, among the plurality of sets, by which an entire size demarcated by the effective range of the search sensor in one set among the plurality of sets becomes maximum, determining a destination of the local vehicle, based on the certain set, and instructing, on the determined destination, a drive unit being provided in the local vehicle and achieving movement of the local vehicle.

In one aspect of the invention, a control method of a vehicle, includes:

estimating an environment model relating to a search region, based on environment information acquired by an environment sensor, wherein the environment sensor acquires the environment information representing an environment around a local vehicle among one or more vehicles, and the environment sensor is provided in the local vehicle;

estimating an effective range based on the estimated environment model, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor provided in each vehicle of the one or more vehicles; and configuring a plurality of sets being configurable by the candidate destinations, which are different from one another, of all the vehicles, determining, based on the estimated effective range, a certain set, among the plurality of sets, by which an entire size demarcated by the effective range of the search sensor in one set among the plurality of sets becomes maximum, determining a destination of the local vehicle, based on the certain set, and instructing, on the determined destination, a drive unit being provided in the local vehicle and achieving movement of the local vehicle.

In one aspect of the invention, a non-transitory storage medium stores a control program of a vehicle control device. The control program causes a computer provided in a vehicle control device controlling an operation of a local vehicle among one or more vehicles to execute:

environment estimation processing of estimating an environment model relating to a search region, based on environment information acquired by an environment sensor, wherein the environment sensor acquires the environment information representing an environment around the local vehicle, and the environment sensor is provided in the local vehicle;

coverage estimation processing of estimating an effective range based on the environment model estimated by the environment estimation processing, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor provided in each vehicle of the one or more vehicles; and autonomous control processing of configuring a plurality of sets being configurable by the candidate destinations, which are different from one another, of all the vehicles, determining, based on the effective range estimated by the coverage estimation processing, a certain set, among the plurality of sets, by which an entire size demarcated by the effective range of the search sensor in one set among the plurality of sets becomes maximum, determining a destination of the local vehicle, based on the certain set, and instructing, on the determined destination, a drive unit being provided in the local vehicle and achieving movement of the local vehicle.

Advantageous Effects of Invention

The present invention has an advantageous effect that, even when an effective range of a search sensor depends on an environment around the search sensor, it is possible to control in such a way that each of vehicles mounted with the search sensor autonomously moves to a site where an object can be more effectively searched for.

BRIEF DESCRIPTION OF DRAWINGS

FIG. 11 is a table illustrating a size of an effective range of a search sensor, when respective vehicles in the third example embodiment of the present invention move to candidate destinations different from one another.

FIG. 14 is a table illustrating object detection information, when respective vehicles in the fourth example embodiment of the present invention move to candidate destinations different from one another.

FIG. 17 is a table illustrating a size of an effective range and search efficiency of a search sensor, when respective vehicles in the fifth example embodiment of the present invention move to candidate destinations different from one another.

FIG. 18 is a table illustrating a distance between each vehicle in the fifth example embodiment of the present invention and a candidate destination.

FIG. 19 is a table illustrating object detection information and search efficiency, when respective vehicles in the fifth example embodiment of the present invention move to candidate destinations different from one another.

EXAMPLE EMBODIMENT

Hereinafter, example embodiments of the present invention will be described in detail with reference to the drawings. Note that a same reference sign is given to an equivalent component in all the drawings, and a description is appropriately omitted.

First Example Embodiment

A configuration in the present example embodiment is described.

Figure 1:
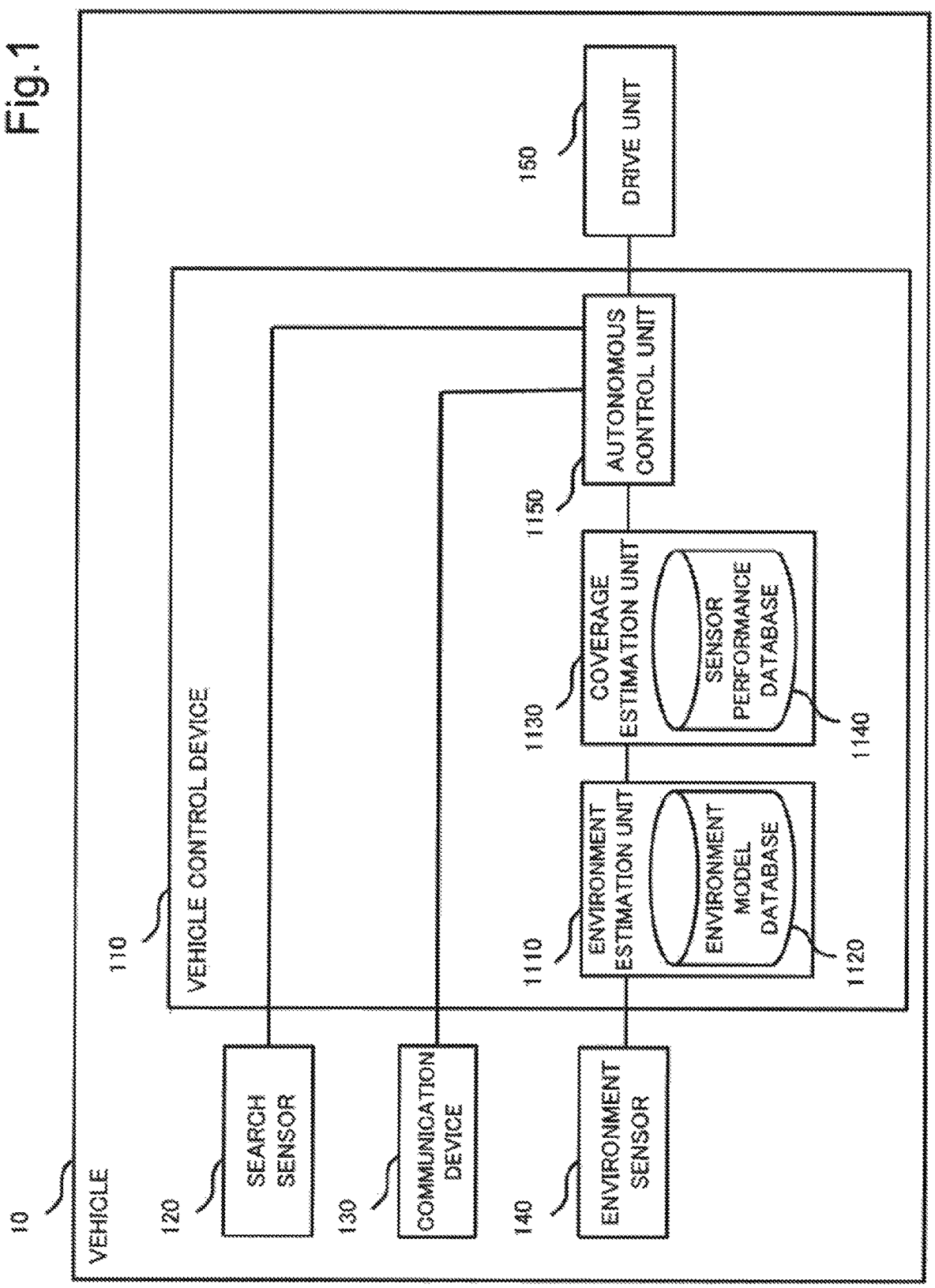
FIG. 1 is a block diagram illustrating one example of a configuration of a vehicle in a first example embodiment of the present invention.

FIG. 1 is a block diagram illustrating one example of a configuration of a vehicle in a first example embodiment of the present invention.

Vehicle 10 in the present example embodiment is a device having a sensor which searches for an object existing in a search region, and being autonomously movable. Vehicle 10 is, for example, an underwater vehicle, a floating vehicle, a land vehicle, or a flying body. Vehicle 10 includes search sensor 120, communication device 130, environment sensor 140, drive unit 150, and vehicle control device 110.

Search sensor 120 is a sensor which searches for an object existing in a search region. Search sensor 120 is, for example, a sonar, a radar, or a camera.

It is assumed that an effective range of search sensor 120 is a range in which an object can be detected. An effective range can be expressed by a set (group) of data representing a value associated with each position constituting a search region. It is assumed that a data format of a set (group) constituted by data representing a value (e.g., a value indicating whether or not a position is within the effective range) associated with each position is referred to as a "map format" in the following description. For example, each position in a map format may be represented by an order of appearance of data representing a value associated with each position, or may be represented by data representing a coordinate (a combination of latitude, longitude, altitude, or the like) of a position associated with each piece of data. A map format is, for example, a data format representing a set (group) of data representing a value associated with each partial region in a search region. An effective range can be expressed by, for example, a set (group) of data representing a value ($a_i$; $a_i$ is 1 when within an effective range, and is 0 otherwise) indicating whether each partial region ($r_i$) constituting a search region is within an effective range. Alternatively, an effective range can be expressed by, for example, a set (group) of data representing a value ($q_i$) indicating a detection probability of an object, when an object exists in each partial region ($r_i$) constituting a search region. Hereinafter, information (data) representing an effective range is also simply referred to as an "effective range".

Search sensor 120 outputs object information (data) representing a search result of an object. Object information is, for example, information indicating a set (group) of existence probability ($p_i$) of an object at each position ($r_i$) constituting a search region. Object information can be expressed by a map format.

Communication device 130 communicates with another vehicle (hereinafter, also referred to as a "consort vehicle") having a same configuration as a local vehicle (hereinafter, also referred to as an "own vehicle") among the vehicles 10. Communication device 130 is utilized for, for example, transmission of vehicle position information (data) representing a position of the own vehicle to the consort vehicle, and reception of the vehicle position information representing a position of the consort vehicle from the consort vehicle.

Environment sensor 140 acquires environment information (data) indicating an environment around the own vehicle. Herein, environment information is information relating to an environmental factor affecting an effective range of search sensor 120. Depending on a kind of search sensor 120, environment information is, for example, information indicating temperature, pressure, a flow speed, electric conductivity, or transparency. Environment sensor 140 is widely known to those skilled in the art, and therefore, is not described in detail herein.

Drive unit 150 is a device which achieves movement of vehicle 10. Drive unit 150 is a device which achieves movement of vehicle 10, for example, in water, on water, on land, or in atmosphere. Drive unit 150 is widely known to those skilled in the art, and therefore, is not described in detail herein.

Vehicle control device 110 is connected to search sensor 120, communication device 130, environment sensor 140, and drive unit 150. Vehicle control device 110 controls drive unit 150, based on outputs by search sensor 120, communication device 130, and environment sensor 140. Vehicle control device 110 includes environment estimation unit 1110, coverage estimation unit 1130, and autonomous control unit 1150.

Environment estimation unit 1110 includes environment model database 1120. It is assumed that environment model database 1120 previously holds environment model information (data) for a region including a search region. Environment estimation unit 1110 estimates an environment model (data) in which an environment in a search region is performed modeling, based on information on an environment around the own vehicle acquired by environment sensor 140, and environment model information held by environment model database 1120. An estimated environment model can be expressed by a map format.

It is assumed that modeling is estimating environment information expected at any position in a search region and at one future time point, based on environment information acquired at a small number of positions in a region including a search region and at one nearest time point. In other words, an environment model is information including estimated environment information at any position in a search region and at one future time point. Environment model information is, for example, information including environment information acquired at a plurality (preferably, a large number) of past time points and at a plurality (preferably, a large number) of positions within a region including a search region. Environment estimation unit 1110 estimates, as an environment model, for example, environment model information including information on an environment around the own vehicle most similar to information on an environment around the own vehicle, acquired by environment sensor 140. Alternatively, environment estimation unit 1110 may estimate an environment model, for example, by performing interpolation, extrapolation, weighted averaging, or the like in relation to time, for environment model information at a plurality of time points. Moreover, environment estimation unit 1110 may estimate an environment model, for example, by performing interpolation, extrapolation, weighted averaging, or the like in relation to a position, for environment model information at one time point.

Coverage estimation unit 1130 includes sensor performance database 1140. Coverage estimation unit 1130 estimates an effective range of search sensor 120 of the own vehicle, based on an environment model estimated by environment estimation unit 1110, and performance information (data) representing performance of search sensor 120 of the own vehicle and being held by sensor performance database 1140.

Coverage estimation unit 1130 estimates an effective range of search sensor 120 of the consort vehicle, based on an environment model estimated by environment estimation unit 1110, and performance information representing performance of search sensor 120 of the consort vehicle and being held by sensor performance database 1140.

Sensor performance database 1140 previously holds performance information relating to search sensor 120 for each vehicle 10.

Autonomous control unit 1150 determines a destination of the own vehicle, based on each piece of the following information.
- object information detected by search sensor 120,
- data representing an effective range of search sensor 120 provided in each vehicle 10 estimated by coverage estimation unit 1130,
- vehicle position information of the own vehicle, and
- vehicle position information of the consort vehicle acquired via communication device 130.

Based on information (data) representing a destination of the own vehicle determined by autonomous control unit 1150, drive unit 150 achieves movement of the own vehicle to the destination.

Figure 2:
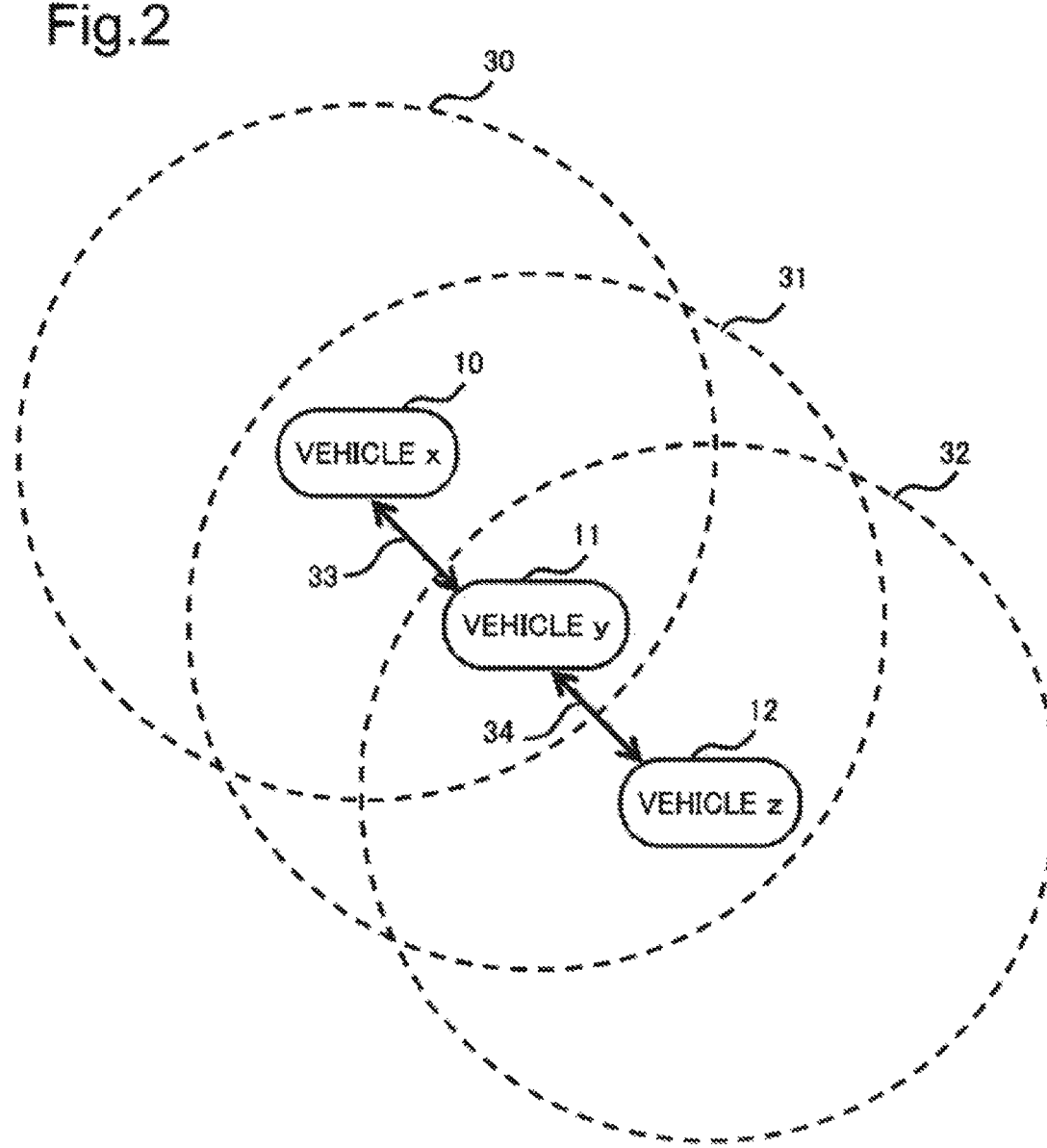
FIG. 2 is a schematic diagram illustrating arrangement and communication ranges of a plurality of vehicles.

FIG. 2 is a schematic diagram illustrating arrangement and communication ranges of a plurality of vehicles.

In FIG. 2, three vehicles being vehicle 10 (vehicle x), vehicle 11 (vehicle y), and vehicle 12 (vehicle z) are illustrated.

Since a communication range of communication device 130 provided in vehicle x is communication range 30, vehicle x is communicable with vehicle y by connection (link) 33. On the other hand, vehicle x is not communicable with vehicle z located outside of communication range 30.

Since a communication range of communication device 130 provided in vehicle y is communication range 31, vehicle y is communicable with vehicle x and vehicle z by connection 33 and connection 34.

Since a communication range of communication device 130 provided in vehicle z is communication range 32, vehicle z is communicable with vehicle y by connection 34. On the other hand, vehicle z is not communicable with vehicle x located outside of communication range 32.

Communication ranges of communication devices 130 provided in vehicle x, vehicle y, and vehicle z are each sufficiently larger than a distance between the respective vehicles, and all the vehicles may be communicable with one another. Alternatively, communication device 130 provided in vehicle x and communication device 130 provided in vehicle z may be communicable with each other by relay using communication device 130 provided in vehicle y.

An operation in the present example embodiment is described.

Figure 3:
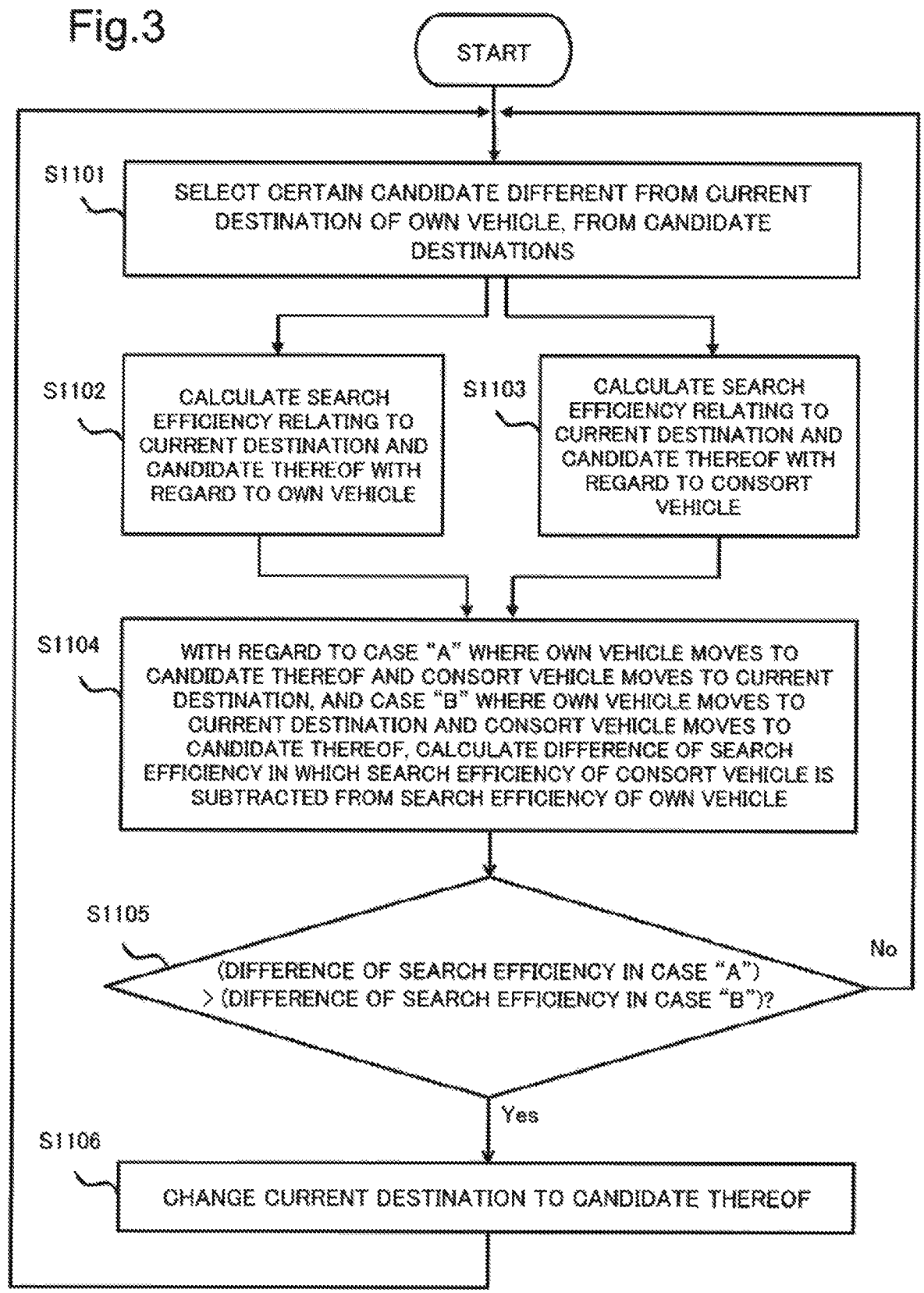
FIG. 3 is a flowchart illustrating an operation of a vehicle control device in the first example embodiment of the present invention.

FIG. 3 is a flowchart illustrating an operation of the vehicle control device in the first example embodiment of the present invention. More specifically, FIG. 3 is a flowchart illustrating an operation of determining a destination of the own vehicle. Note that the flowchart illustrated in FIG. 3 and the following description are examples, and processing orders or the like may be changed, processing may be returned, or processing may be repeated, appropriately depending on required processing.

First, autonomous control unit 1150 selects one candidate destination different from a destination (hereinafter, referred to as a "current destination") at the time point of the own vehicle, as a candidate to be a current destination next (hereinafter, simply referred to as a "candidate") (step S1101). Herein, a candidate destination is a candidate of a destination of a vehicle. It is assumed that vehicle control device 110 previously holds information relating to a candidate destination.

Next, autonomous control unit 1150 calculates search efficiency when the own vehicle moves to a current destination and the candidate (step S1102), and also calculates search efficiency when the consort vehicle moves to a current destination and the candidate (step S1103). In a case of calculating search efficiency regarding the consort vehicle in step S 1103, when the consort vehicle exists within a communication range of the own vehicle, autonomous control unit 1150 calculates search efficiency with regard to the consort vehicle. When the consort vehicle does not exist within a communication range of the own vehicle, autonomous control unit 1150 does not calculate search efficiency regarding the consort vehicle.

Further, with regard to a case (case A) where the own vehicle moves to the candidate and the consort vehicle moves to a current destination, and a case (case B) where the own vehicle moves to a current destination and the consort vehicle moves to the candidate, autonomous control unit 1150 calculates a difference of search efficiency in which search efficiency of the consort vehicle is subtracted from search efficiency of the own vehicle (step S1104). Herein, when search efficiency regarding the consort vehicle is not calculated in step S1103 due to nonexistence of the consort vehicle within a communication range of the own vehicle, a difference of search efficiency is search efficiency of the own vehicle calculated in step S1102.

Furthermore, autonomous control unit 1150 compares differences of search efficiency in case A and case B (step S1105). When a difference of search efficiency in case B is equal to or more than a difference of search efficiency in case A (No in step S1105), autonomous control unit 1150 returns to processing in step S1101 without changing a current destination. When a difference of search efficiency in case B is less than a difference of search efficiency in case A (Yes in step S1105), autonomous control unit 1150 changes a current destination to a candidate selected in step S1101 (step S1106), and returns to processing in step S1101.

Autonomous control unit 1150 determines a destination of the own vehicle by selecting all candidate destinations as candidates and then repeatedly executing processing in step S1101 to step S1106. However, autonomous control unit 1150 may determine a destination of the own vehicle by selecting some of all candidate destinations as candidates and then repeatedly executing processing in step S1101 to step S1106.

Autonomous control unit 1150 may determine a destination of the own vehicle, adaptively to a change of an environment over time, by repeatedly executing the above-described processing of determining a destination of the own vehicle.

Figure 4:
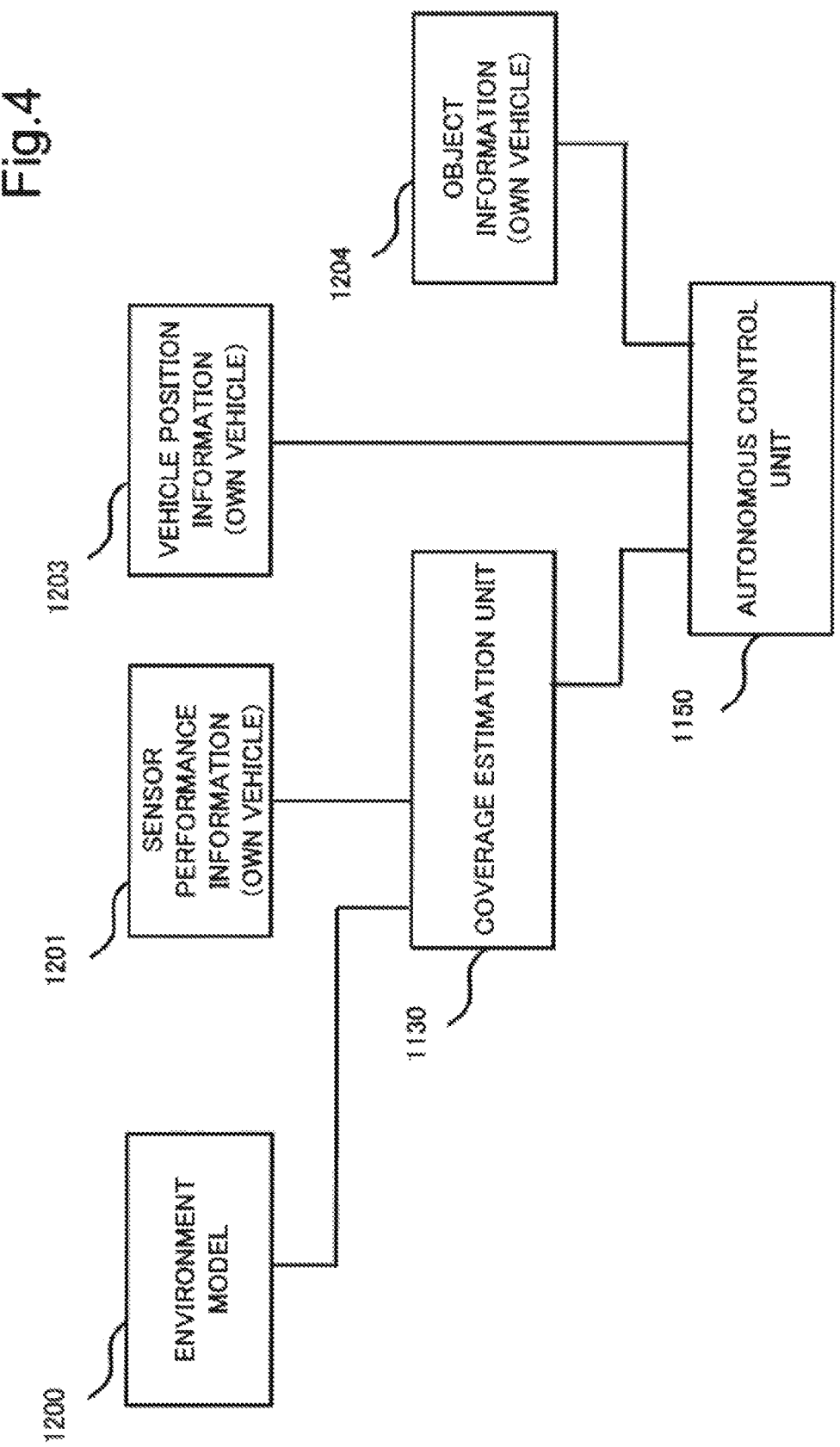
FIG. 4 is a schematic diagram illustrating flow of data in calculation processing of search efficiency regarding the own vehicle.

FIG. 4 is a schematic diagram illustrating flow of data in calculation processing of search efficiency regarding the own vehicle.

Environment model 1200 is an environment model estimated by environment estimation unit 1110. Environment model 1200 is used for estimation of an effective range in a search region of search sensor 120. Environment model 1200 includes, for example, environment information affecting estimation of propagation of a sound wave, an electric wave, light, or the like in a search region.

Sensor performance information (own vehicle) 1201 is performance information, of search sensor 120 provided in the own vehicle, held by sensor performance database 1140.

Based on environment model 1200 and sensor performance information (own vehicle) 1201, coverage estimation unit 1130 calculates an effective range of search sensor 120 when the own vehicle moves to each candidate destination. Herein, for example, based on input environment model 1200, coverage estimation unit 1130 calculates propagation in an environment of a sound wave, an electric wave, light, or the like utilized by search sensor 120, and calculates an effective range of search sensor 120 of the own vehicle. A calculated effective range can be expressed by a map format.

Vehicle position information (own vehicle) 1203 is vehicle position information indicating a current position of the own vehicle.

Object information (own vehicle) 1204 is object information output by search sensor 120 of the own vehicle.

Autonomous control unit 1150 calculates object detection information, based on input object information (own vehicle) 1204. It is assumed that object detection information is information indicating a set (group) of entropy ($I_i=-p_i \log(p_i)$) of existence probability ($p_i$) of an object in each partial region ($r_i$) constituting a search region. Each value ($I_i$) constituting object detection information becomes a greater value, when existence or nonexistence of an object in each partial region ($r_i$) constituting a search region is more uncertain. Object detection information can be expressed by a map format.

Based on data representing an effective range of search sensor 120 of the own vehicle calculated by coverage estimation unit 1130, vehicle position information (own vehicle) 1203, and the above-described object detection information (data) relating to the own vehicle, autonomous control unit 1150 calculates search efficiency (data) when the own vehicle moves to a candidate destination. Herein, in a case where a vehicle moves to a candidate destination and then searches for an object by use of a search sensor, search efficiency becomes a greater value when the search is more effective in reduction of a sum ($\Sigma I_i$) of object detection information. Herein, it is assumed that a sum of object detection information is a sum of respective values ($I_i$) constituting object detection information in an effective range of a search sensor of a vehicle. Moreover, search efficiency becomes a greater value when a vehicle can move to a candidate destination in a shorter time.

Autonomous control unit 1150 calculates search efficiency ($\eta$) by calculating, for example, an equation "$\eta=u/v$". Herein, "/" represents division. It is assumed that the value u is a value ($\Sigma a_i I_i$) in which a product of a value ($a_i$) represented by each piece of data in an effective range associated with each partial region ($r_i$) constituting a search region and expressed by a map format, and a value ($I_i$) represented by each piece of data of object detection information expressed by a map format is added in a search region. Moreover, it is assumed that the value ai is 1 when within an effective range, and is 0 otherwise. Further, it is assumed that the value v is a distance between a current position of the own vehicle and a candidate destination.

Figure 5:
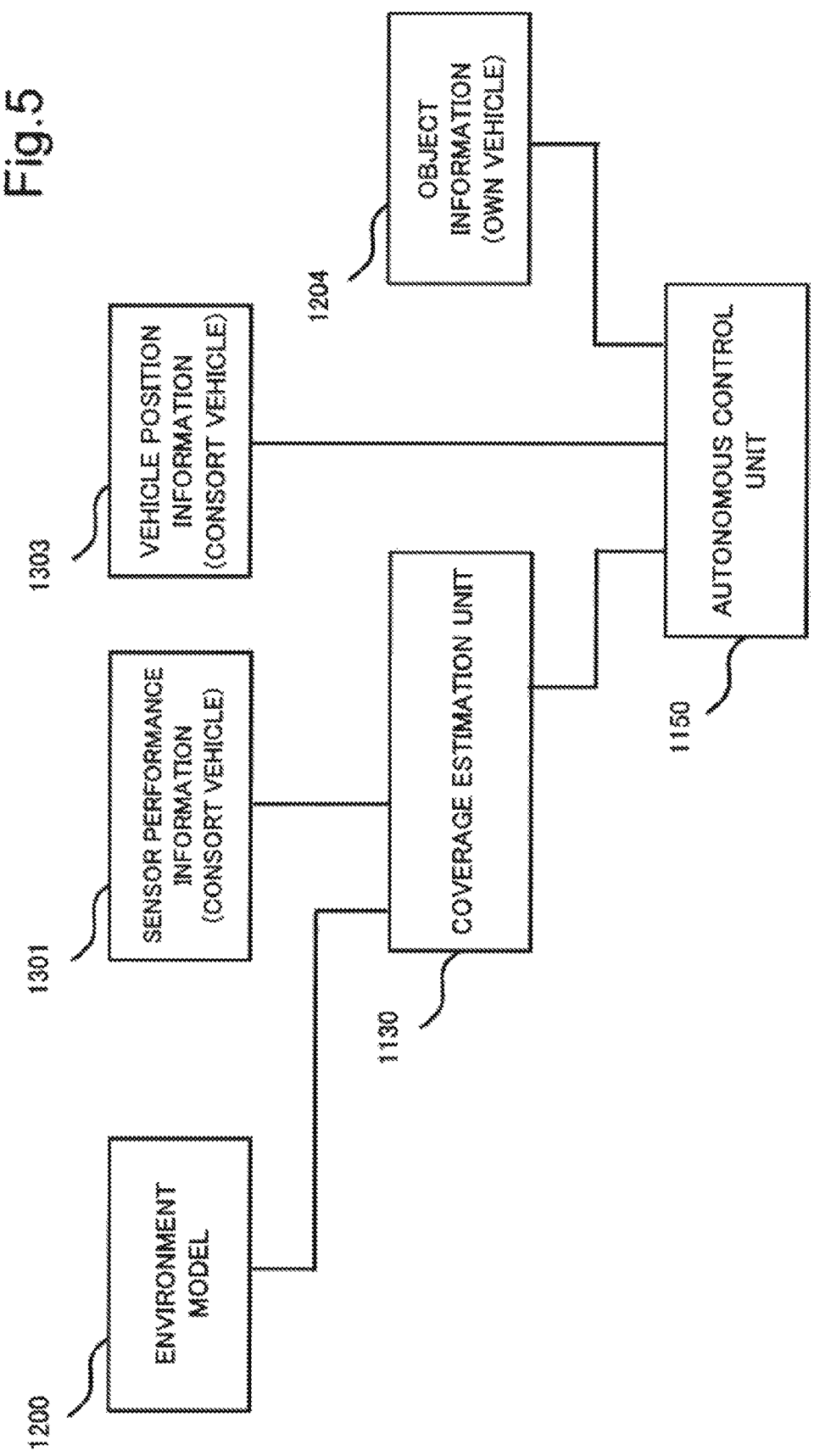
FIG. 5 is a schematic diagram illustrating flow of data in calculation processing of search efficiency regarding the consort vehicle.

FIG. 5 is a schematic diagram illustrating flow of data in calculation processing of search efficiency regarding the consort vehicle.

A difference between flow of data in calculation processing illustrated in FIG. 5 and flow of data in calculation processing illustrated in FIG. 4 is described.

Sensor performance information (consort vehicle) 1301 is performance information, of search sensor 120 provided in a consort vehicle, held by sensor performance database 1140.

Based on environment model 1200 and the sensor performance information (consort vehicle) 1301, coverage estimation unit 1130 calculates an effective range of search sensor 120 when the consort vehicle moves to each candidate destination. Herein, environment model 1200 is environment model information estimated in the own vehicle. In other words, an environment model estimated in the own vehicle is used as approximation of an environment model estimated in the consort vehicle. However, when an environment model estimated in the own vehicle lacks in accuracy as approximation of an environment model estimated in the consort vehicle, coverage estimation unit 1130 may acquire an environment model estimated in the consort vehicle, from the consort vehicle, by use of communication device 130.

Vehicle position information (consort vehicle) 1303 is vehicle position information being acquired from the consort vehicle by use of communication device 130 and indicating a position of the consort vehicle.

As described above, object information (own vehicle) 1204 is object information output by search sensor 120 of the own vehicle. In other words, object information calculated in the own vehicle is used as approximation of object information calculated in the consort vehicle. However, when object information calculated in the own vehicle lacks in accuracy to be used as approximation of object information calculated in the consort vehicle, autonomous control unit 1150 may acquire, from the consort vehicle, object information calculated in the consort vehicle, by use of communication device 130.

Autonomous control unit 1150 calculates object detection information, based on input object information (own vehicle) 1204.

Based on data representing an effective range of search sensor 120 of the consort vehicle calculated by coverage estimation unit 1130, vehicle position information (consort vehicle) 1303, and the above-described object detection information relating to the own vehicle, autonomous control unit 1150 calculates search efficiency when the consort vehicle moves to a candidate destination.

Autonomous control unit 1150 calculates search efficiency by calculating, for example, an equation "$\eta = u/v$", as in the above-described calculation of search efficiency when the own vehicle moves to a candidate destination. However, it is assumed that a value ($a_t$) is a value represented by each piece of data representing an effective range of search sensor 120 of the consort vehicle. Moreover, it is assumed that the value v is a distance between a current position of the consort vehicle and a candidate destination.

Then, based on data representing calculated search efficiency of the own vehicle and the consort vehicle, autonomous control unit 1150 determines a destination of the own vehicle in such a way that a sum of search efficiency of respective vehicles 10, when respective vehicles 10 move to one of destinations different from one another, becomes maximum.

As described above, in vehicle control device 110 according to the present example embodiment, environment estimation unit 1110 estimates an environment model relating to a search region, based on environment information representing an environment around the own vehicle acquired by environment sensor 140. Then, based on the estimated environment model, coverage estimation unit 1130 estimates an effective range of search sensor 120 when each vehicle 10 moves to each candidate destination. Then, autonomous control unit 1150 acquires vehicle position information of the consort vehicle by use of communication device 130. Then, based on data representing the estimated effective range of search sensor 120, object information in a search region, and the acquired vehicle position information of each vehicle 10, autonomous control unit 1150 calculates search efficiency of each vehicle 10. Search efficiency becomes a greater value when a range in which an object existing in a search region can be searched for is wider. Moreover, search efficiency becomes a greater value when existence or nonexistence of an object is more uncertain in an effective range of search sensor 120. Then, autonomous control unit 1150 determines a destination of the own vehicle in such a way that a sum of search efficiency of respective vehicles 10 becomes maximum. Therefore, vehicle control device 110 according to the present example embodiment has an advantageous effect of being able to, even when an effective range of search sensor 120 depends on an environment around search sensor 120, control in such a way that vehicle 10 mounting with search sensor 120 autonomously moves to a site where an object can be more effectively searched for.

In vehicle control device 110 according to the present example embodiment, autonomous control unit 1150 calculates search efficiency of each vehicle 10 by dividing a value in which object detection information in a search region is added in an effective range of search sensor 120 when each vehicle 10 moves to each candidate destination, by a movement distance of the vehicle. In other words, search efficiency becomes a greater value when vehicle 10 can arrive at a destination earlier. Therefore, vehicle control device 110 according to the present example embodiment has an advantageous effect that a destination of each vehicle 10 can be determined by prioritizing a candidate destination having a shorter movement time from each vehicle 10 to each candidate destination.

Second Example Embodiment

Next, a second example embodiment of the present invention based on the first example embodiment of the present invention is described. A vehicle in the present example embodiment is an underwater vehicle.

A configuration in the present example embodiment is described.

Figure 6:
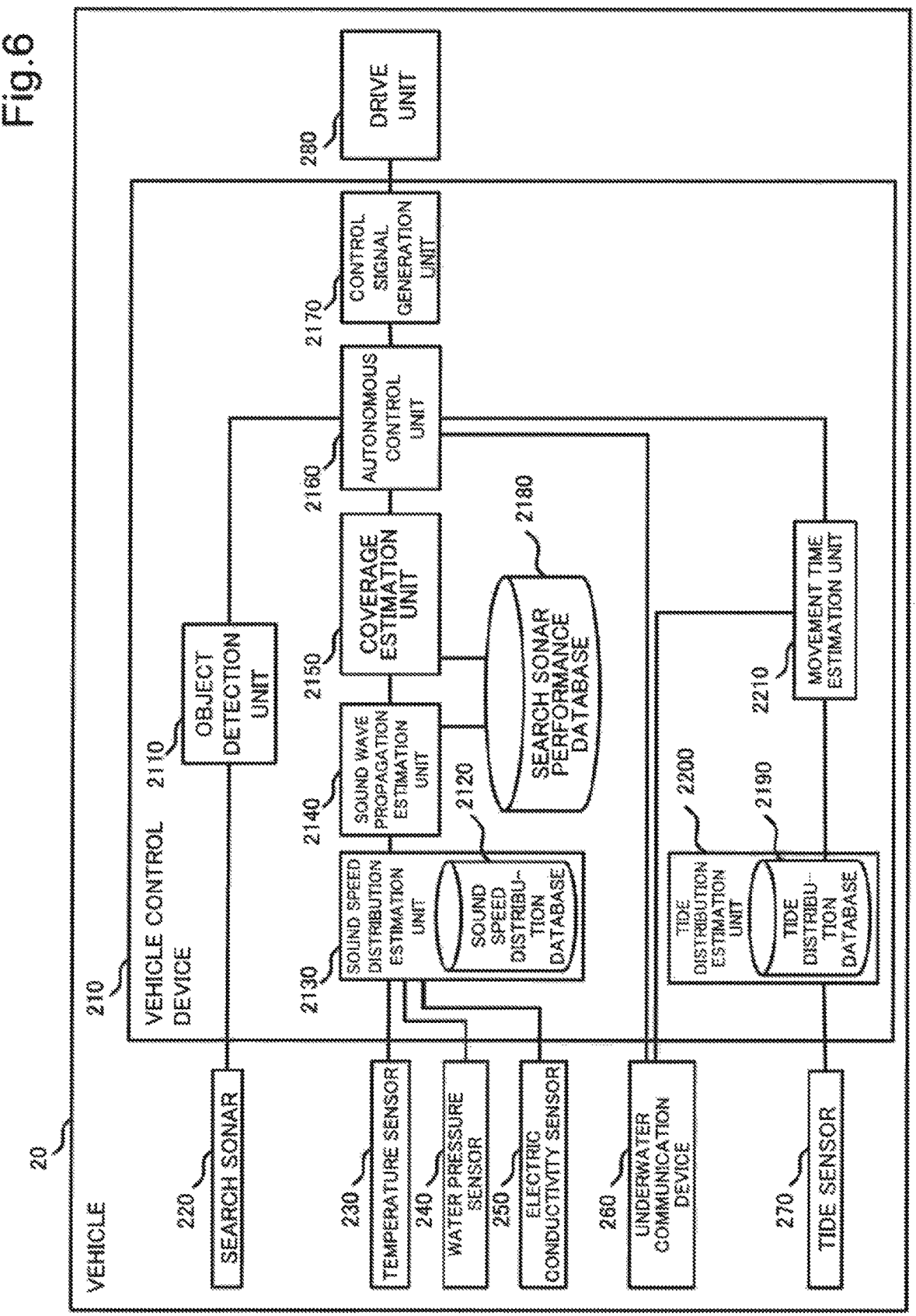
FIG. 6 is a block diagram illustrating one example of a configuration of a vehicle in a second example embodiment of the present invention.

FIG. 6 is a block diagram illustrating one example of a configuration of a vehicle in the second example embodiment of the present invention.

Vehicle 20 in the present example embodiment is an underwater vehicle having a sonar which searches for an object existing in a search region, and being autonomously movable. Vehicle 20 includes search sonar 220, underwater communication device 260, temperature sensor 230, water pressure sensor 240, electric conductivity sensor 250, tide sensor 270, drive unit 280, and vehicle control device 210.

Search sonar 220 is an acoustic sensor (sonar) which searches for an object existing in a search region, and outputs acoustic data corresponding to a search result.

Underwater communication device 260 communicates with the consort vehicle.

Temperature sensor 230, water pressure sensor 240, and electric conductivity sensor 250 are respectively environment sensors which measure water temperature, water pressure, and electric conductivity around the own vehicle, and acquire environment information relating to water temperature, water pressure, and electric conductivity.

Tide sensor 270 is a sensor which detects tide around the own vehicle, and outputs tide data corresponding to a detection result.

Drive unit 280 is a device which achieves movement of vehicle 20 in water.

Vehicle control device 210 includes object detection unit 2110, sound speed distribution estimation unit 2130, search sonar performance database 2180, sound wave propagation estimation unit 2140, coverage estimation unit 2150, tide distribution estimation unit 2200, movement time estimation unit 2210, autonomous control unit 2160, and control signal generation unit 2170.

Object detection unit 2110 calculates object information indicating existence probability of an object in each partial region constituting a search region, based on acoustic data output by search sonar 220. Calculation of existence probability of an object based on acoustic data is widely known to those skilled in the art, and therefore, is not described in detail herein. Then, object detection unit 2110 calculates object detection information, based on the calculated object information. The calculated object detection information can be expressed by a map format.

Sound speed distribution estimation unit 2130 includes sound speed distribution database 2120. It is assumed that sound speed distribution database 2120 previously holds sound speed distribution information (data) in a region including a search region. In addition to environment information, the sound speed distribution information includes information indicating a sound speed calculated based on the environment information.

Based on each piece of the following information, sound speed distribution estimation unit 2130 estimates a sound speed distribution model (data) in which a sound speed distribution in a search region is performed modeling.

information on an environment around the own vehicle, acquired by temperature sensor 230, water pressure sensor 240, and electric conductivity sensor 250, and
sound speed distribution information held by sound speed distribution database 2120.

Herein, the estimated sound speed distribution model can be expressed by a map format.

It is assumed that modeling is estimating environment information expected at any position in a search region and at one future time point, based on environment information acquired at a small number of positions in a region including a search region and at a nearest time point, and estimating (calculating) a sound speed distribution, based on the estimated environment information. In other words, a sound speed distribution model is information including information indicating an estimated sound speed at any position in a search region and at one future time point. Sound speed distribution information is, for example, information including environment information acquired at a plurality (preferably, a large number) of past time points and at a plurality (preferably, a large number) of positions within a region including a search region. Sound speed distribution estimation unit 2130 estimates, as a sound speed distribution model, for example, information indicating a sound speed included in sound speed distribution information including information on an environment around the own vehicle most similar to information on an environment around the own vehicle, acquired by temperature sensor 230, water pressure sensor 240, and electric conductivity sensor 250. Alternatively, sound speed distribution estimation unit 2130 may estimate a sound speed distribution model, for example, by performing interpolation, extrapolation, weighted averaging, or the like in relation to time, for sound speed distribution information at a plurality of time points. Moreover, sound speed distribution estimation unit 2130 may estimate a sound speed distribution model, for example, by performing interpolation, extrapolation, weighted averaging, or the like in relation to a position, for sound speed distribution information at one time point.

Search sonar performance database 2180 previously holds search sonar performance information (data) indicating performance of search sonar 220 of each vehicle 20. Search sonar performance information includes, for example, information about a frequency of a sound wave used by search sonar 220.

Sound wave propagation estimation unit 2140 estimates sound wave propagation information (data) indicating sound wave propagation to the own vehicle and the consort vehicle, based on a sound speed distribution model estimated by sound speed distribution estimation unit 2130, and search sonar performance information of the consort vehicle and the own vehicle held by search sonar performance database 2180. Sound wave propagation information is, for example, information representing a sound wave propagation distance at each position constituting a search region and at a frequency of a sound wave used by search sonar 220. Sound wave propagation information can be expressed by a map format (e.g., having estimation information for each predetermined range in a combination of latitude, longitude, and depth).

Coverage estimation unit 2150 estimates effective ranges of search sonars 220 of the own vehicle and the consort vehicle, based on sound wave propagation information estimated by sound wave propagation estimation unit 2140, and search sonar performance information of the consort vehicle and the own vehicle held by search sonar performance database 2180. The estimated effective range can be expressed by a map format.

Tide distribution estimation unit 2200 includes tide distribution database 2190. It is assumed that tide distribution database 2190 previously holds tide distribution information (data) indicating a flow speed of tide at each position of a region including a search region. Based on tide data representing a flow speed of tide around the own vehicle, output by tide sensor 270, and tide distribution information held by tide distribution database 2190, tide distribution estimation unit 2200 estimates tide distribution model (data) in which a tide distribution in a search region is performed modeling. The estimated tide distribution model can be expressed by a map format.

It is assumed that modeling is estimating a flow speed of tide expected at any position in a search region and at one future time point, based on a flow speed of tide acquired at a small number of positions in a region including a search region and at a nearest time point. In other words, tide distribution model is information including a flow speed of tide estimated at any position in a search region and at one future time point. Tide distribution information is, for example, information including a flow speed of tide observed at a plurality (preferably, a large number) of past time points and at a plurality (preferably, a large number) of positions within a region including a search region. Tide distribution estimation unit 2200 estimates, as a tide distribution model, for example, tide distribution information including information (data) representing a flow speed of tide around the own vehicle, closest to information (data) representing a flow speed of tide around the own vehicle, acquired by tide sensor 270. Alternatively, tide distribution estimation unit 2200 may estimate a tide distribution model, for example, by performing interpolation, extrapolation, weighted averaging, or the like in relation to time, for tide distribution information at a plurality of time points. Moreover, tide distribution estimation unit 2200 may estimate a tide distribution model, for example, by performing interpolation, extrapolation, weighted averaging, or the like in relation to a position, for tide distribution information at one time point.

Based on a tide distribution model estimated by tide distribution estimation unit 2200, vehicle position information of the consort vehicle acquired by use of underwater communication device 260, and vehicle position information (not illustrated) of the own vehicle, movement time estimation unit 2210 estimates a movement time required for movement for the own vehicle or the consort vehicle to move from a current position to a certain candidate destination. For example, at each position along a movement path to a candidate destination of vehicle 20, movement time estimation unit 2210 calculates a speed synthesizing a speed of vehicle 20, in water, having no tide achieved by drive unit 280, and a flow speed of tide represented by a tide distribution model estimated by tide distribution estimation unit 2200. Then, with regard to minute movement of vehicle 20 along a movement path, movement time estimation unit 2210 calculates a time required for the minute movement, by dividing a minute movement distance by a degree of a synthesized speed. Then, movement time estimation unit 2210 calculates a movement time (data) to a candidate destination of vehicle 20, by adding a time required for minute movement along the movement path. The estimated movement time can be expressed by a map format in which a movement time associated with a candidate destination is data.

Autonomous control unit 2160 determines a destination of the own vehicle, based on object detection information calculated by object detection unit 2210, data representing effective ranges of search sonars 220 of the own vehicle and the consort vehicle, estimated by coverage estimation unit 2150, vehicle position information of the own vehicle and the consort vehicle, and information (data) representing a movement time estimated by movement time estimation unit 2210.

Based on information (data) representing a destination of the own vehicle, determined by autonomous control unit 2160, control signal generation unit 2170 generates a control signal, for drive unit 280, which achieves movement to a determined destination of the own vehicle.

In other words, search sonar 220 and object detection unit 2110 in the present example embodiment correspond to parts of search sensor 120 and autonomous control unit 1150 in the first example embodiment. Moreover, underwater communication device 260 in the present example embodiment corresponds to communication device 130 in the first example embodiment. Further, temperature sensor 230, water pressure sensor 240, and electric conductivity sensor 250 in the present example embodiment correspond to environment sensor 140 in the first example embodiment. Further, drive unit 280 in the present example embodiment corresponds to drive unit 150 in the first example embodiment. Further, vehicle control device 210 in the present example embodiment corresponds to vehicle control device 110 in the first example embodiment. Further, sound speed distribution estimation unit 2130 and sound wave propagation estimation unit 2140 in the present example embodiment correspond to environment estimation unit 1110 in the first example embodiment. Further, coverage estimation unit 2150 and search sonar performance database 2180 in the present example embodiment correspond to coverage estimation unit 1130 in the first example embodiment. Further, autonomous control unit 2160 in the present example embodiment corresponds to autonomous control unit 1150 in the first example embodiment. Further, control signal generation unit 2170 in the present example embodiment corresponds to a part of drive unit 150 in the first example embodiment.

However, with regard to tide sensor 270, tide distribution estimation unit 2200, tide distribution database 2190, and movement time estimation unit 2210 in the present example embodiment, there are not corresponding components in the first example embodiment.

Other configurations in the present example embodiment are the same as the configurations in the first example embodiment.

An operation in the present example embodiment is described.

Figure 7:
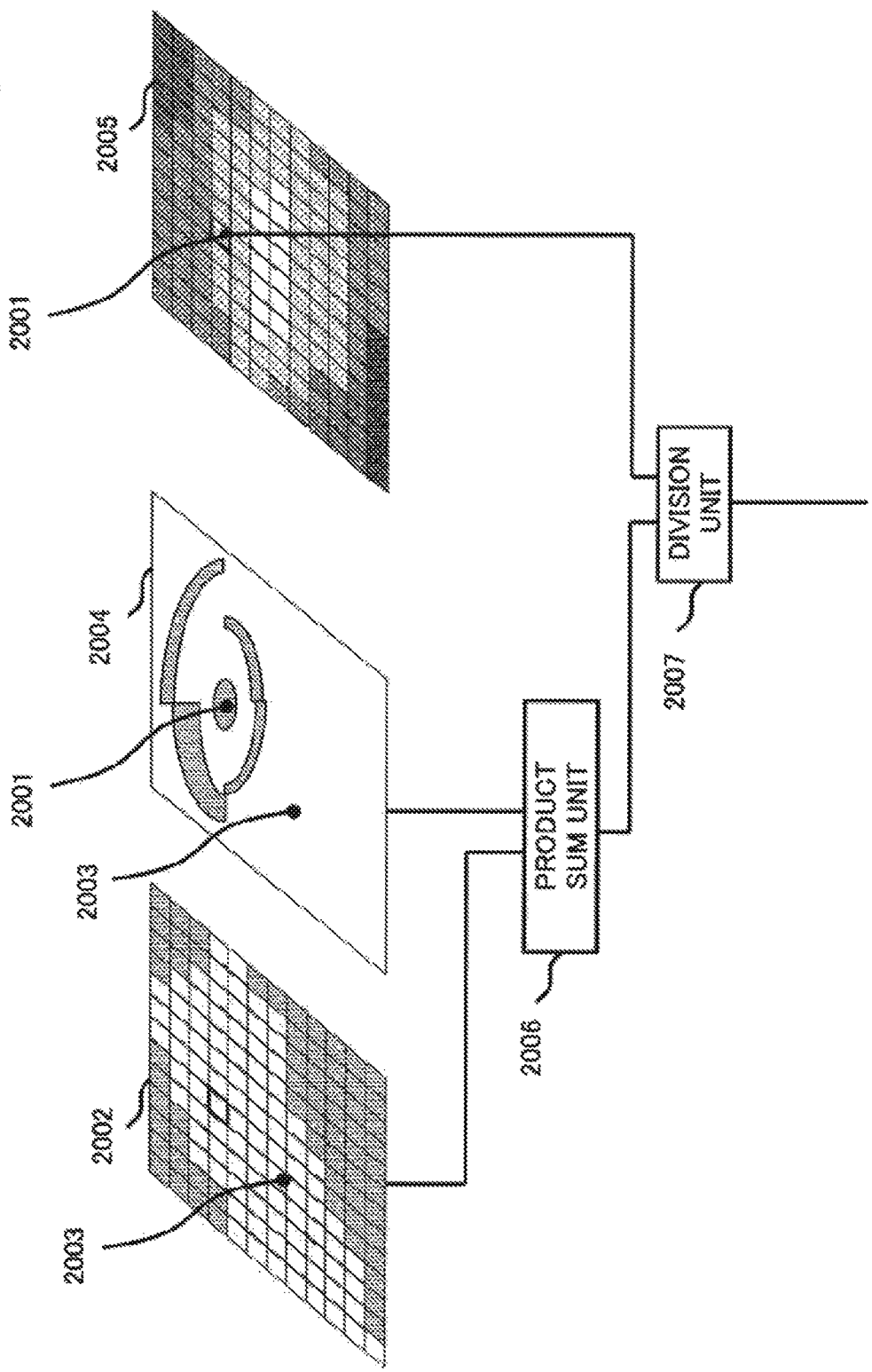
FIG. 7 is a schematic diagram illustrating one example of an operation of a vehicle control device in the second example embodiment of the present invention.

FIG. 7 is a schematic diagram illustrating one example of an operation of a vehicle control device in the second example embodiment of the present invention. More specifically, FIG. 7 is a diagram illustrating an operation of calculating search efficiency in autonomous control unit 2160. In FIG. 7, in a value expressed by a map format, a map representing a search region is schematically expressed by a plane, and a difference of values at respective positions constituting a map is schematically expressed by a difference of mesh patterns. Moreover, in a map, depth is omitted among latitude, longitude, and depth, and each partial region constituting a search region is expressed by one grid.

Object detection information 2002 is object detection information calculated by object detection unit 2110 with regard to a certain search region, and expressed by a map format.

Effective range 2004 is information (data) representing an effective range estimated by coverage estimation unit 2150 and expressed by a map format, when certain vehicle 20 moves to a certain candidate destination 2001 in the above-described search region.

Movement time 2005 is data representing a movement time required for above-described vehicle 20 to move from a current position to each position in the above-described search region, estimated by movement time estimation unit 2210, and expressed by a map format.

In all partial regions 2003 in a search region, product sum unit 2006 provided in autonomous control unit 2160 adds products of values represented by data indicating a same position on a map and associated with partial regions 2003, with regard to object detection information 2002, and effective range 2004 of search sonar 220. As a result, product sum unit 2006 outputs data representing a product sum value regarding candidate destination 2001.

Division unit 2007 provided in autonomous control unit 2160 calculates search efficiency, by dividing data representing a product sum value output from product sum unit 2006 by a value represented by data indicating a movement time required for movement to candidate destination 2001 among movement time 2005.

Search efficiency calculated by division unit 2007 becomes a greater value, when a range in which an object can be searched for at candidate destination 2001 is wider. Moreover, the search efficiency becomes a greater value, when existence or nonexistence of an object in effective range 2004 of search sonar 220 is more uncertain. In addition, the search efficiency becomes a greater value, when a movement time of vehicle 20 to candidate destination 2001 is shorter.

Autonomous control unit 2160 executes the above-described processing of calculating search efficiency with regard to all cases where each vehicle moves to each candidate destination. However, autonomous control unit 2160 may execute the above-described processing of calculating search efficiency with regard to some of all cases where each vehicle moves to each candidate destination.

Other operations in the present example embodiment are the same as the operations in the first example embodiment.

As described above, vehicle 20 according to the present example embodiment includes components corresponding to components of vehicle 10 according to the first example embodiment. Therefore, vehicle 20 according to the present example embodiment has similar advantageous effect as that of vehicle 10 according to the first example embodiment.

Vehicle 20 according to the present example embodiment includes tide sensor 270, tide distribution estimation unit 2200, and movement time estimation unit 2210 which do not correspond to components of vehicle 10 according to the first example embodiment. Then, in vehicle 20 according to the present example embodiment, due to tide sensor 270, tide distribution estimation unit 2200, and movement time estimation unit 2210, estimation of a movement time based on tide around vehicle 20 is possible. Therefore, vehicle 20 according to the present example embodiment has an advantageous effect that estimation accuracy of a movement time is higher than that of vehicle 10 according to the first example embodiment.

Third Example Embodiment

Next, a third example embodiment of the present invention being a basis of the first example embodiment of the present invention is described.

A configuration in the present example embodiment is described.

Figure 8:
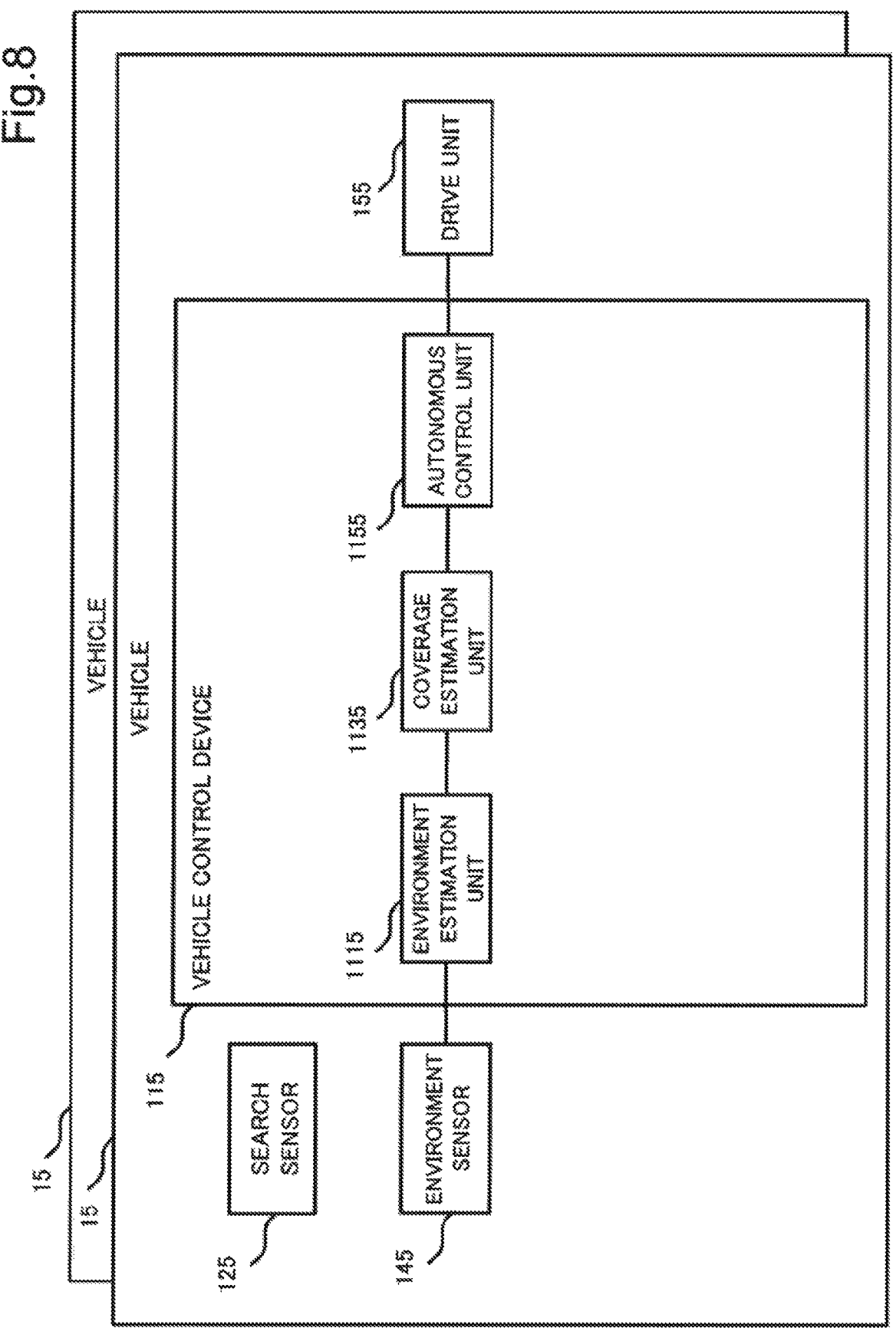
FIG. 8 is a block diagram illustrating one example of a configuration of a vehicle in a third example embodiment of the present invention.

FIG. 8 is a block diagram illustrating one example of a configuration of a vehicle in the third example embodiment of the present invention.

Each of one or more vehicles 15 includes search sensor 125, environment sensor 145, drive unit 155, and vehicle control device 115.

Search sensor 125 is a sensor which searches for an object existing in a search region.

Environment sensor 145 is a sensor which acquires environment information representing an environment around the own vehicle among vehicles 15.

Drive unit 155 achieves movement of the own vehicle.

Vehicle control device 115 controls drive unit 155. Vehicle control device 115 includes environment estimation unit 1115, coverage estimation unit 1135, and autonomous control unit 1155.

Environment estimation unit 1115 estimates an environment model relating to a search region, based on environment information acquired by environment sensor 145.

Coverage estimation unit 1135 estimates, based on the environment model estimated by environment estimation unit 1115, an effective range of search sensor 125 in a search region when each vehicle 15 moves to each predetermined candidate destination.

Autonomous control unit 1155 configures all sets configurable by candidate destinations, which are different from one another, of all vehicles 15. Then, autonomous control unit 1155 calculates an entire size demarcated by an effective range of search sensor 125 in one set among all the sets, based on data representing an effective range estimated by coverage estimation unit 1135. Herein, a number of all the sets described above is a number ($_mP_n$) of permutations for selecting destinations (n destinations), which are different from one another, of the respective vehicles from candidate destinations (m candidate destinations). m is a natural number, and n is natural number being less than or equal to m. However, autonomous control unit 1155 may execute the above-described processing of calculating an entire size of effective ranges, with regard to some of all sets configured by candidate destinations, which are different from one another, of all vehicles 15. Then, autonomous control unit 1155 determines a certain set, among all the sets, by which an entire size demarcated by an effective range of search sensor 125 becomes maximum. Then, autonomous control unit 1155 determines a destination of the own vehicle, based on the certain set. Then, autonomous control unit 1155 instructs drive unit 155 on the determined destination.

An operation in the present example embodiment is described.

Figure 9:
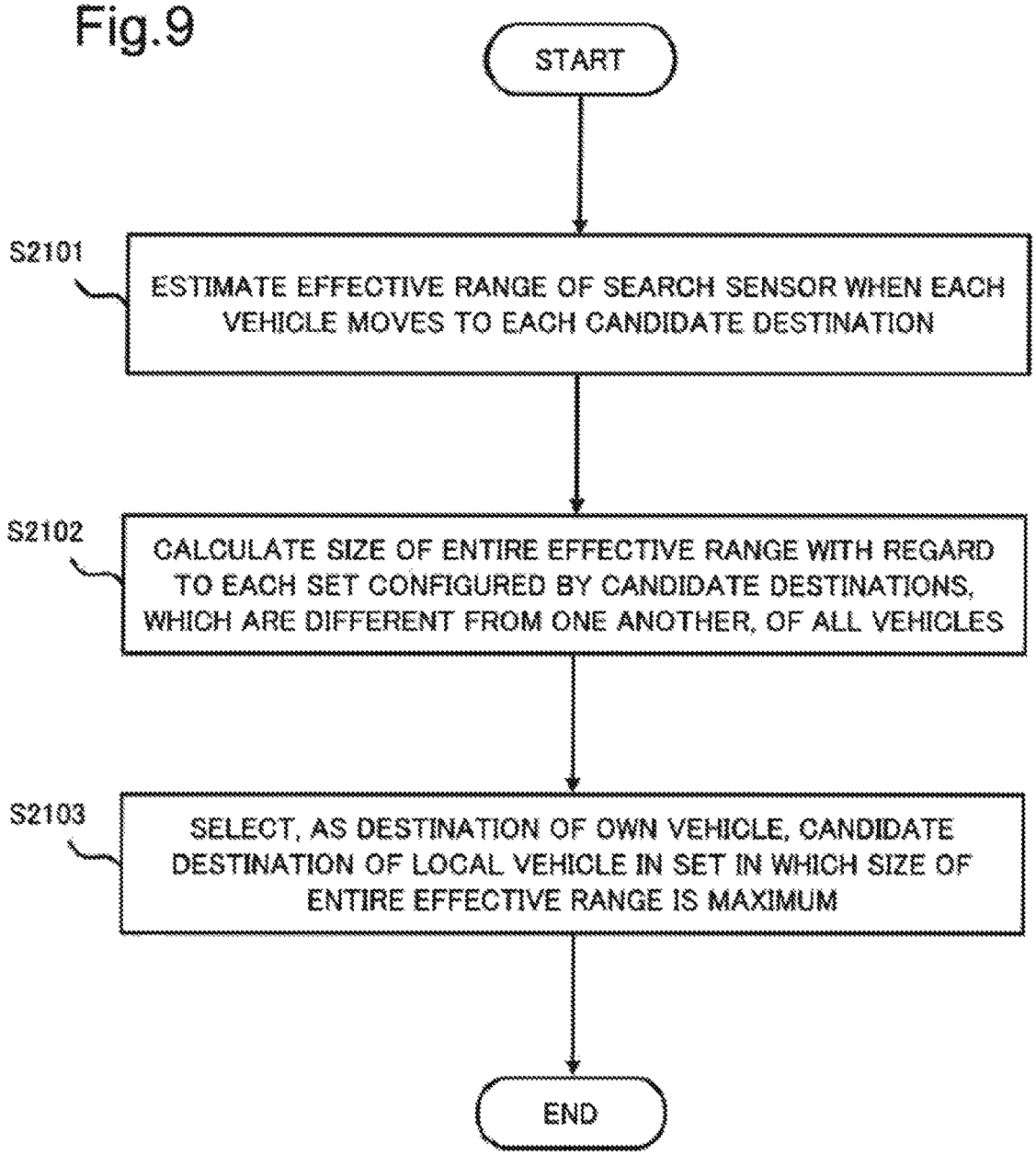
FIG. 9 is a flowchart illustrating an operation of a vehicle control device in the third example embodiment of the present invention.

FIG. 9 is a flowchart illustrating an operation of a vehicle control device in the third example embodiment of the present invention. More specifically, FIG. 9 is a flowchart illustrating an operation of determining a destination of the own vehicle. Note that the flowchart illustrated in FIG. 9 and the following description are examples, and processing orders or the like may be changed, processing may be returned, or processing may be repeated, appropriately depending on required processing.

First, coverage estimation unit 1135 estimates, based on an environment model estimated by environment estimation unit 1115, an effective range of search sensor 125 in a search region when each vehicle 15 moves to each predetermined candidate destination (step S2101).

Next, autonomous control unit 1155 configures all sets configurable by candidate destinations, which are different from one another, of all vehicles 15. Then, autonomous control unit 1155 calculates an entire size demarcated by an effective range of search sensor 125 in one set among all the sets, based on data representing an effective range estimated by coverage estimation unit 1135 (step S2102). Herein, a size of an effective range is, for example, a volume. In a search region, a size of an effective range may be an area, for example, when altitude is negligible. Moreover, when overlap of an effective range of each search sensor 125 is negligible, an entire size of effective ranges may be calculated by adding a size of an effective range of each search sensor 125. A value, in each partial region, of an effective range expressed by a map format is, for example, "1" when within an effective range, or "0" when out of an effective range. Alternatively, a value, in each partial region, of an effective range expressed by a map format may be a multiple value of three or more values, or a continuous value, depending on resolution of search sensor 125 in each partial region.

Furthermore, autonomous control unit 1155 determines a certain set, among all the sets, by which an entire size demarcated by an effective range becomes maximum. Then, autonomous control unit 1155 selects, as a destination of the own vehicle, a candidate destination of the own vehicle in the certain set (step S2103).

Figure 10:
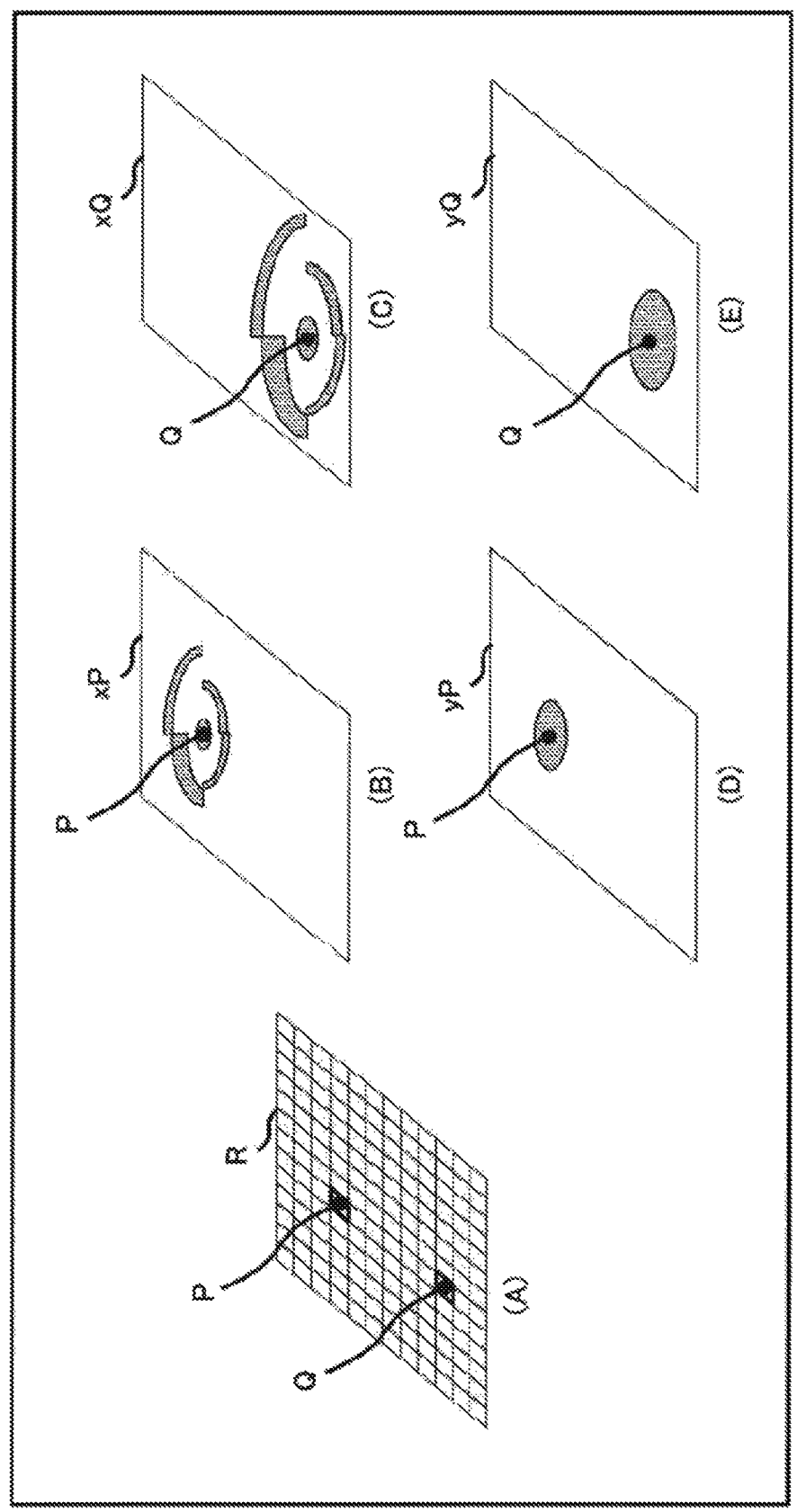
FIG. 10 is a schematic diagram illustrating one example of an operation of the vehicle control device in the third example embodiment of the present invention.

FIG. 10 is a schematic diagram illustrating one example of an operation of the vehicle control device in the third example embodiment of the present invention. More specifically, FIG. 10 is a diagram illustrating one example of an operation of calculating an entire size of effective ranges in search sensor 125. In FIG. 10, in a value expressed by a map format, a map representing a search region is schematically expressed by a plane, and a difference of values at respective positions constituting a map is schematically expressed by a difference of mesh patterns. Moreover, in a map, depth is omitted among latitude, longitude, and depth, and each partial region constituting a search region is expressed by one grid. In addition, in FIG. 10, sings "P" and "Q" represent candidate destinations. Further, in FIG. 10, sings "xP", "xQ", "yP", and "yQ" respectively represent effective ranges of search sensor 125, when vehicle x moves to candidate destination P, when vehicle x moves to candidate destination Q, when vehicle y moves to candidate destination P, and when vehicle y moves to candidate destination Q. A description is given below by using the above-described signs. Portion (A) of FIG. 10 represents a search region. A search region is schematically expressed by a plane. Each partial region in a search region is expressed by one grid. Portions (B) to (E) of FIG. 10 each represent an effective range (map format) of search sensor 125.

As illustrated in portions (B) to (E) of FIG. 10, an effective range of search sensor 125 may differ depending on performance of search sensor 125 of each vehicle, or may differ depending on an environment at each position in a search region.

FIG. 11 is a table illustrating a size of an effective range of a search sensor, when respective vehicles in the third example embodiment of the present invention move to candidate destinations different from one another.

As illustrated in FIG. 11, a size of effective range xP is "50", a size of effective range xQ is "100", a size of effective range yP is "30", and a size of effective range yQ is "60". As indicated by a row of "size 1" in FIG. 11, a total of sizes of effective ranges, in a case where vehicle x moves to candidate destination P, and vehicle y moves to candidate destination Q, is "110". On the other hand, as indicated by a row of "size 2" in FIG. 11, a total of sizes of effective ranges, in a case where vehicle x moves to candidate destination Q, and vehicle y moves to candidate destination P, is "130".

Accordingly, autonomous control unit 1155 determines the "case where vehicle x moves to candidate destination Q, and vehicle y moves to candidate destination P", as one set by which an entire size of effective ranges becomes maximum. Then, autonomous control unit 1155 selects, as a destination of the own vehicle, a candidate destination of the own vehicle in the determined one set. In other words, autonomous control unit 1155 selects candidate destination Q as a destination when a vehicle is vehicle x. On the other hand, autonomous control unit 1155 selects candidate destination P as a destination when a vehicle is vehicle y.

As described above, in vehicle control device 115 according to the present example embodiment, environment estimation unit 1115 estimates an environment model relating to a search region, based on environment information representing an environment around the own vehicle acquired from environment sensor 145. Then, based on the estimated environment model, coverage estimation unit 1135 estimates an effective range of search sensor 125 when each vehicle 15 moves to each candidate destination. Then, based on data representing the estimated effective range of search sensor 125, environment estimation unit 1115 calculates an effective range of search sensor 125 in each vehicle 15. Then, autonomous control unit 1155 determines a destination of the own vehicle in such a way that an entire size of effective ranges of search sensor 125 in each vehicle 15 becomes maximum. Therefore, vehicle control device 115 according to the present example embodiment has an advantageous effect of being able to, when an effective range of search sensor 125 depends on an environment around search sensor 125, control in such a way that vehicle 15 mounting with search sensor 125 autonomously moves to a site where an object can be more effectively searched for.

Fourth Example Embodiment

Next, a fourth example embodiment of the present invention based on the third example embodiment of the present invention is described. A vehicle control device according to the present example embodiment determines a destination of the own vehicle by prioritizing a candidate destination where existence or nonexistence of an object in a search region is more uncertain.

A configuration in the present example embodiment is described.

Figure 12:
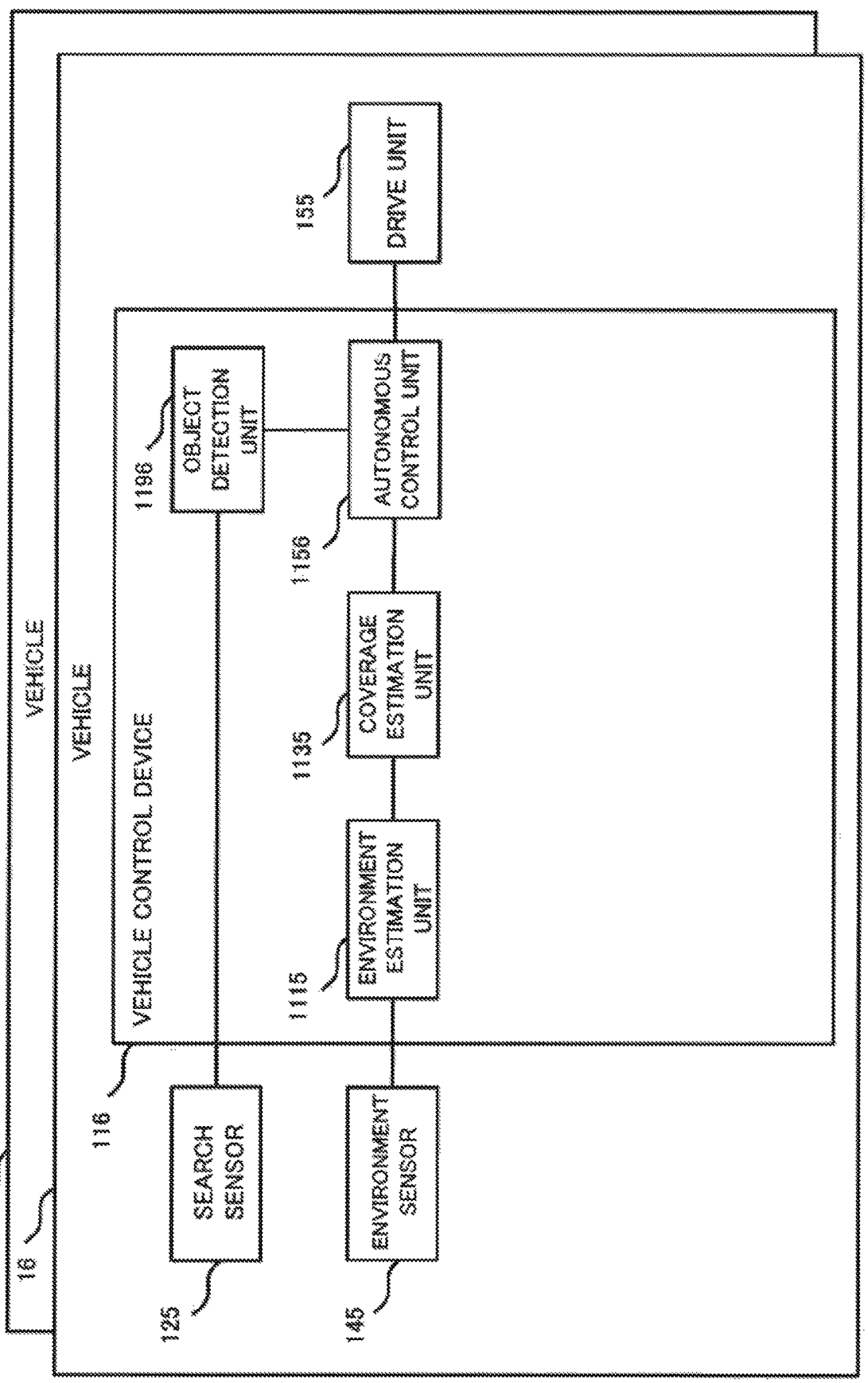
FIG. 12 is a block diagram illustrating one example of a configuration of vehicles in a fourth example embodiment of the present invention.

FIG. 12 is a block diagram illustrating one example of a configuration of vehicles in the fourth example embodiment of the present invention.

Each of one or more vehicles 16 includes search sensor 125, environment sensor 145, drive unit 155, and vehicle control device 116.

Vehicle control device 116 includes environment estimation unit 1115, coverage estimation unit 1135, autonomous control unit 1156, and object detection unit 1196.

Based on data representing a detection result by search sensor 125, object detection unit 1196 calculates existence probability ($p_i$) (object information) of an object in each partial region ($q_i$) being included in a search region and having a predetermined size.

Autonomous control unit 1156 calculates entropy ($I_i = -p_i \log(p_i)$) (object detection information) relating to the existence probability ($p_i$) of an object in each partial region ($r_i$), based on object information ($p_i$) calculated by object detection unit 1196. Herein, object detection information may be calculated by object detection unit 1196.

Then, based on the calculated object detection information, autonomous control unit 1156 calculates a first sum ($\Sigma I_i$) of object detection information in an effective range, in a case where each vehicle 16 moves to each candidate destination. Herein, it is assumed that the first sum is a sum in an effective range, in a case where one vehicle moves to one candidate destination. Then, autonomous control unit 1156 configures all sets configurable by candidate destinations, which are different from one another, of all vehicles 16. Then, autonomous control unit 1156 calculates a second sum in one set among all the sets of the first sum. Then, autonomous control unit 1156 determines a certain set, among all the sets, by which the calculated second sum becomes maximum, and determines a destination of the own vehicle, based on the certain set. Herein, object detection information may be calculated as a sum ($\Sigma a_i I_i$), in all partial regions, of products of the entropy ($I_i$) in each partial region ($r_i$) of an effective range expressed by a map format, and a value ($a_i$) in each partial region ($r_i$) of an effective range expressed by a map format. It is assumed that the value $a_i$ is 1 when within an effective range, and is 0 otherwise. However, autonomous control unit 1156 may execute the above-described processing of calculating the second sum, with regard to some of all sets configured by candidate destinations, which are different from one another, of all vehicles 16.

Other configurations in the present example embodiment are the same as the configurations in the third example embodiment.

An operation in the present example embodiment is described.

Figure 13:
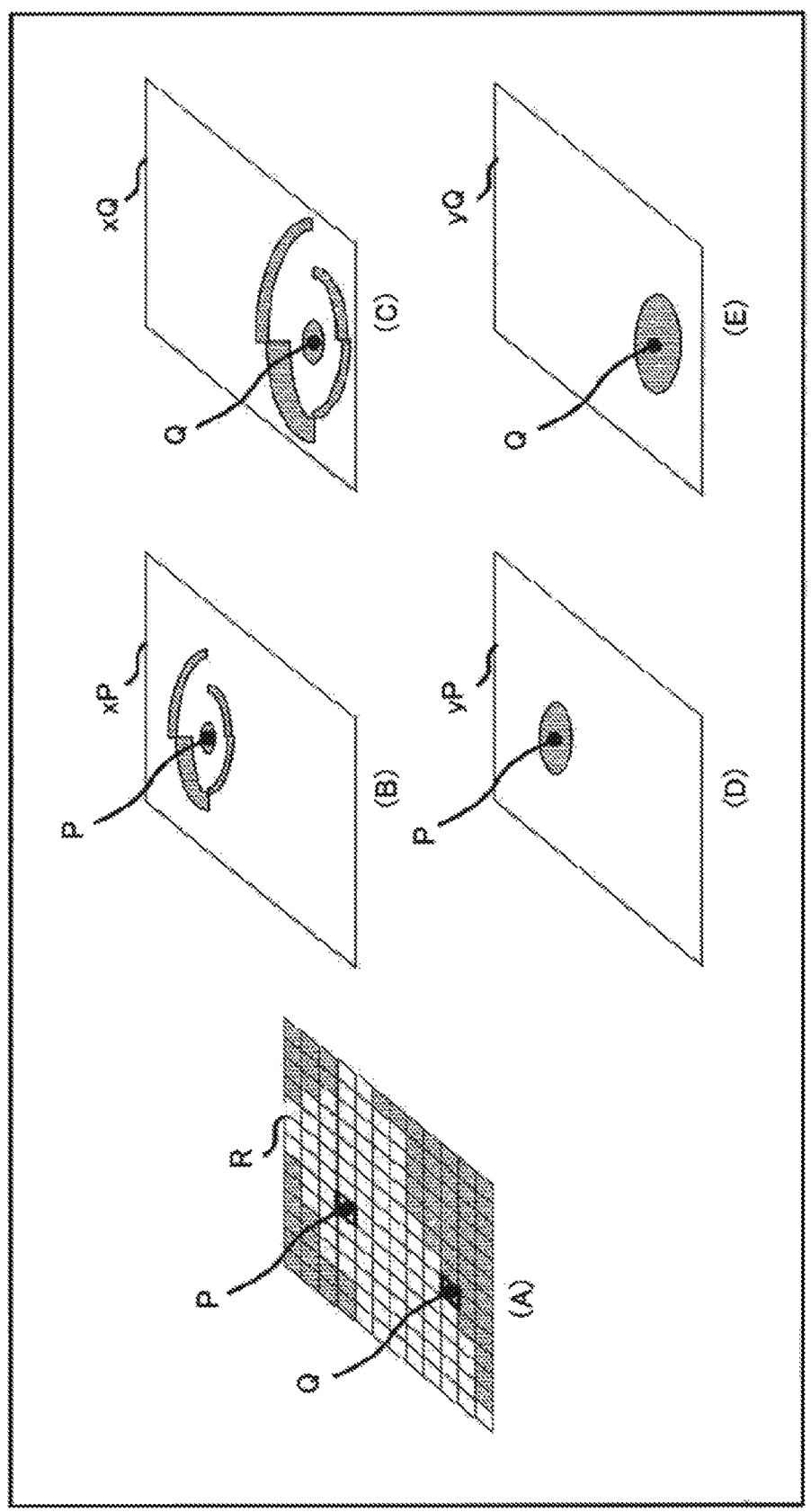
FIG. 13 is a schematic diagram illustrating one example of an operation of a vehicle control device in the fourth example embodiment of the present invention.

FIG. 13 is a schematic diagram illustrating one example of an operation of a vehicle control device in the fourth example embodiment of the present invention. More specifically, FIG. 13 is a diagram illustrating one example of an operation of calculating the above-described second sum. A way of expression in FIG. 13 is similar to a way of expression in FIG. 10. However, portion (A) of FIG. 13 represents object detection information (map format) in each partial region constituting a search region. Portions (B) to (E) of FIG. 13 each represent an effective range (map format) of search sensor 125.

As illustrated in portion (A) of FIG. 13, object detection information in each partial region constituting a search region may differ in each partial region.

FIG. 14 is a table illustrating object detection information, when respective vehicles in the fourth example embodiment of the present invention move to candidate destinations different from one another.

As illustrated in FIG. 14, a first sum of object detection information in effective range xP is "45", a first sum of object detection information in effective range xQ is "40", a first sum of object detection information in effective range yP is "30", and a first sum of object detection information in effective range yQ is "30". As indicated by a row of "object detection information 1" in FIG. 14, a second sum of object detection information, in a case where vehicle x moves to candidate destination P, and vehicle y moves to candidate destination Q, is "75". On the other hand, as indicated by a row of "object detection information 2" in FIG. 14, a second sum of object detection information, in a case where vehicle x moves to candidate destination Q, and vehicle y moves to candidate destination P, is "70".

Accordingly, autonomous control unit 1156 determines the "case where vehicle x moves to candidate destination P, and vehicle y moves to candidate destination Q", as one set by which a second sum becomes maximum. Then, autonomous control unit 1156 selects, as a destination of the own vehicle, a candidate destination of the own vehicle in the determined one set. In other words, autonomous control unit 1156 selects candidate destination P as a destination when a vehicle is vehicle x. On the other hand, autonomous control unit 1156 selects candidate destination Q as a destination when a vehicle is vehicle y.

Other operations in the present example embodiment are the same as the operations in the third example embodiment.

As described above, in vehicle control device 116 according to the present example embodiment, object detection unit 1196 calculates object information in each partial region, based on data representing a detection result by search sensor 125. Then, autonomous control unit 1156 calculates a first sum of object detection information, when each vehicle 16 moves to each candidate destination, based on data representing an effective range of search sensor 125 estimated by coverage estimation unit 1135, and object information in a search region calculated by object detection unit 1196. Object detection information becomes a greater value when existence or nonexistence of an object is more uncertain. Then, autonomous control unit 1156 determines a destination of the own vehicle in such a way that a second sum of object detection information in respective vehicles 16 in one set among all sets configurable by candidate destinations, which are different from one another, of all vehicles 16 becomes maximum. Therefore, in addition to the advantageous effect in the third example embodiment, vehicle control device 116 according to the present example embodiment has an advantageous effect that a destination of the own vehicle can be determined by prioritizing a candidate destination where existence or nonexistence of an object in a search region is more uncertain.

Fifth Example Embodiment

Next, a fifth example embodiment of the present invention based on the third or fourth example embodiment of the present invention is described. A vehicle control device according to the present example embodiment determines a destination of the own vehicle by prioritizing a candidate destination having a shorter movement time from each vehicle to each candidate destination.

A configuration in the present example embodiment is described.

Figure 15:
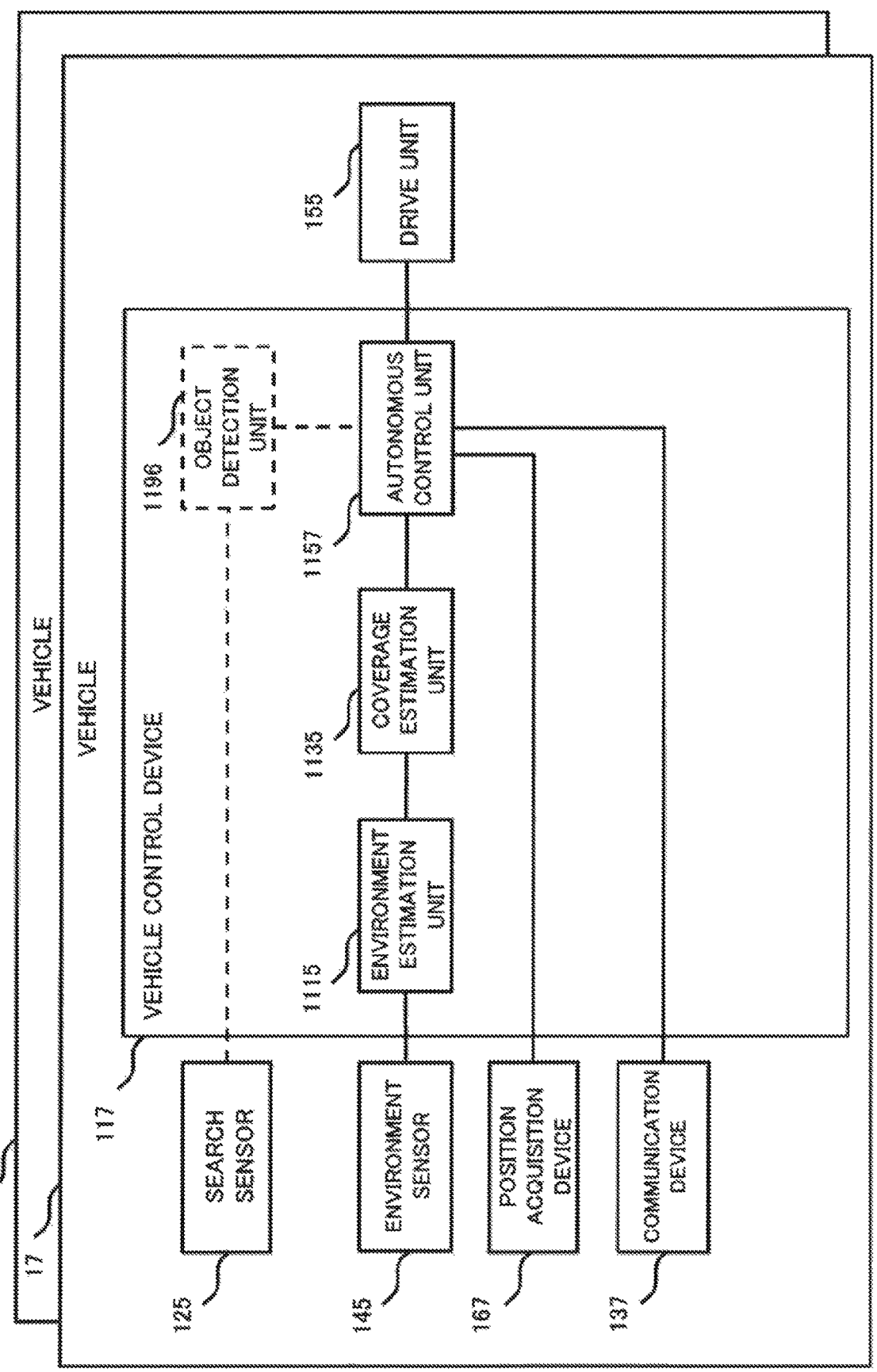
FIG. 15 is a block diagram illustrating one example of a configuration of vehicles in a fifth example embodiment of the present invention.

FIG. 15 is a block diagram illustrating one example of a configuration of vehicles in the fifth example embodiment of the present invention.

Each of one or more vehicles 17 includes search sensor 125, environment sensor 145, drive unit 155, vehicle control device 117, position acquisition device 167, and communication device 137.

Vehicle control device 117 includes environment estimation unit 1115, coverage estimation unit 1135, and autonomous control unit 1157. Vehicle control device 117 may further include object detection unit 1196.

Position acquisition device 167 acquires a current position of the own vehicle.

Communication device 137 communicates with another vehicle 17.

Autonomous control unit 1157 acquires vehicle position information indicating a position of the own vehicle, by position acquisition device 167.

By communication device 137, autonomous control unit 1157 transmits vehicle position information of the own vehicle to another vehicle 17, and receives vehicle position information of another vehicle 17 from another vehicle 17.

Autonomous control unit 1157 estimates a movement time required for each vehicle 17 to move to each candidate destination, based on vehicle position information of the own vehicle acquired by position acquisition device 167, or vehicle position information of another vehicle 17 received from another vehicle 17 by communication device 137. Herein, autonomous control unit 1157 estimates a movement time by dividing, for example, a distance between a current position of vehicle 17 and each candidate destination by a predetermined speed. Then, with regard to each of all sets of respective vehicles 17 and the respective candidate destinations, autonomous control unit 1157 calculates either a size of an effective range in search sensor 125 of this vehicle 17 or a first sum of object detection information, based on data representing an effective range estimated by coverage estimation unit 1135. Then, autonomous control unit 1157 calculates search efficiency being a quotient acquired by dividing either a size of an effective range or a sum of object detection information in an effective range by a movement time required for this vehicle 17 to move to the candidate destination. Then, autonomous control unit 1157 configures all sets configurable by candidate destinations, which are different from one another, of all vehicles 17. Then, autonomous control unit 1157 determines a certain set, among all the sets, by which a third sum of the search efficiency in one set among all the sets becomes maximum. Then, autonomous control unit 1157 determines a destination of the own vehicle, based on the certain set.

Other configurations in the present example embodiment are the same as the configurations in the third or fourth example embodiment.

An operation in the present example embodiment is described.

Figure 16:
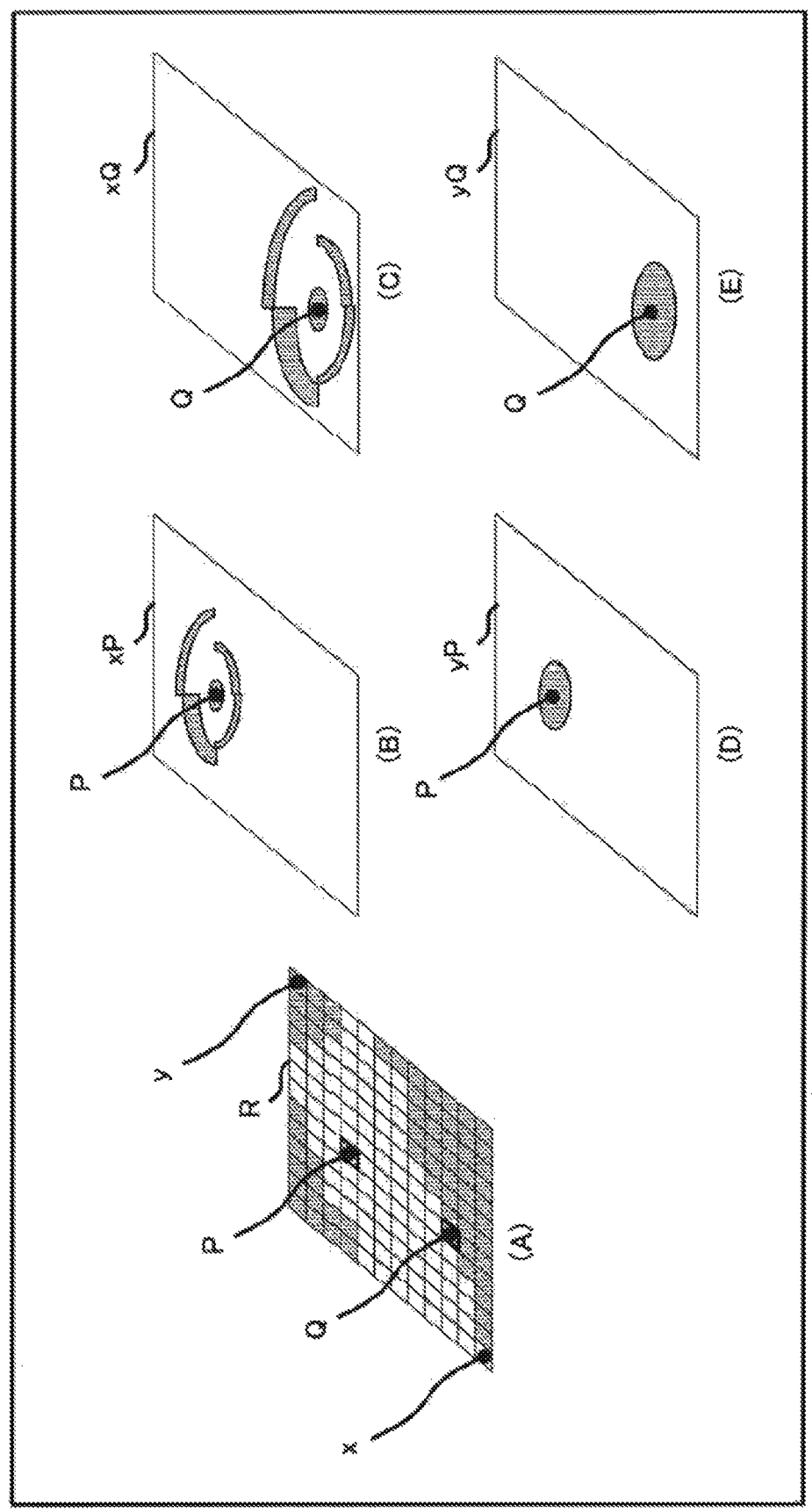
FIG. 16 is a schematic diagram illustrating one example of an operation of a vehicle control device in the fifth example embodiment of the present invention.

FIG. 16 is a schematic diagram illustrating one example of an operation of a vehicle control device in the fifth example embodiment of the present invention. More specifically, FIG. 16 is a diagram illustrating one example of the above-described operation of calculating a sum of search efficiency. A way of expression in FIG. 16 is similar to a way of expression in FIG. 10 or 13. Portion (A) of FIG. 16 represents object information (map format) in a search region or in each partial region constituting a search region. However, in portion (A) of FIG. 16, sings "x" and "y" respectively represent a current position (lower left) of vehicle x and a current position (upper right) of vehicle y. Portions (B) to (E) of FIG. 16 each represent an effective range (map format) of search sensor 125.

FIG. 17 is a table illustrating a size of an effective range and search efficiency of a search sensor, when respective vehicles in the fifth example embodiment of the present invention move to candidate destinations different from one another.

FIG. 18 is a table illustrating a distance between each vehicle in the fifth example embodiment of the present invention and a candidate destination.

As indicated by rows of "size 1" and "size 2" in FIG. 17, a size of effective range xP is "50", a size of effective range xQ is "100", a size of effective range yP is "30", and a size of effective range yQ is "60".

Search efficiency is obtained by dividing a size of each of the effective ranges by a corresponding movement time required for each vehicle to move to each candidate destination. Herein, it is assumed that, when a movement speed of each vehicle is constant, a movement time is proportional to a distance (FIG. 18) between each vehicle and each candidate destination. As indicated by rows of "search efficiency 1" and "search efficiency 2" in FIG. 17, search efficiency corresponding to effective range xP is "5.3", search efficiency corresponding to effective range xQ is "18.5", search efficiency corresponding to effective range yP is "3.9", and search efficiency corresponding to effective range yQ is "5.3". As indicated by a row of the "search efficiency 1" in FIG. 17, a total of search efficiency, in a case where vehicle x moves to candidate destination P, and vehicle y moves to candidate destination Q, is "10.6". On the other hand, as indicated by a row of "search efficiency 2" in FIG. 17, a total of search efficiency, in a case where vehicle x moves to candidate destination Q, and vehicle y moves to candidate destination P, is "22.4".

Accordingly, autonomous control unit 1157 determines the "case where vehicle x moves to candidate destination Q, and vehicle y moves to candidate destination P", as one set by which a third sum of search efficiency becomes maximum. Then, autonomous control unit 1157 selects, as a destination of the own vehicle, a candidate destination of the own vehicle in the determined one set. In other words, autonomous control unit 1157 selects candidate destination Q as a destination when a vehicle is vehicle x. On the other hand, autonomous control unit 1157 selects candidate destination P as a destination when a vehicle is vehicle y.

FIG. 19 is a table illustrating object detection information and search efficiency, when respective vehicles in the fifth example embodiment of the present invention move to candidate destinations different from one another.

As illustrated in FIG. 19, autonomous control unit 1157 may calculate search efficiency based on entropy of object information, instead of search efficiency based on a size of an effective range in search sensor 125.

Other operations in the present example embodiment are the same as the operations in the third or fourth example embodiment.

As described above, in vehicle control device 117 according to the present example embodiment, autonomous control unit 1157 determines, as a destination of the own vehicle, a candidate destination of the own vehicle in one set by which a third sum of search efficiency in one set among all sets configurable by candidate destinations, which are different from one another, of all vehicles 17 becomes maximum. Moreover, a value of search efficiency is greater as a movement time of each vehicle to each candidate destination is shorter. Therefore, in addition to the advantageous effect in the third or fourth example embodiment, vehicle control device 117 according to the present example embodiment has an advantageous effect that a destination of each vehicle can be determined by prioritizing a candidate destination having a shorter movement time from each vehicle to each candidate destination.

Sixth Example Embodiment

Next, a sixth example embodiment of the present invention based on the fifth example embodiment of the present invention is described.

A configuration in the present example embodiment is described.

Figure 20:
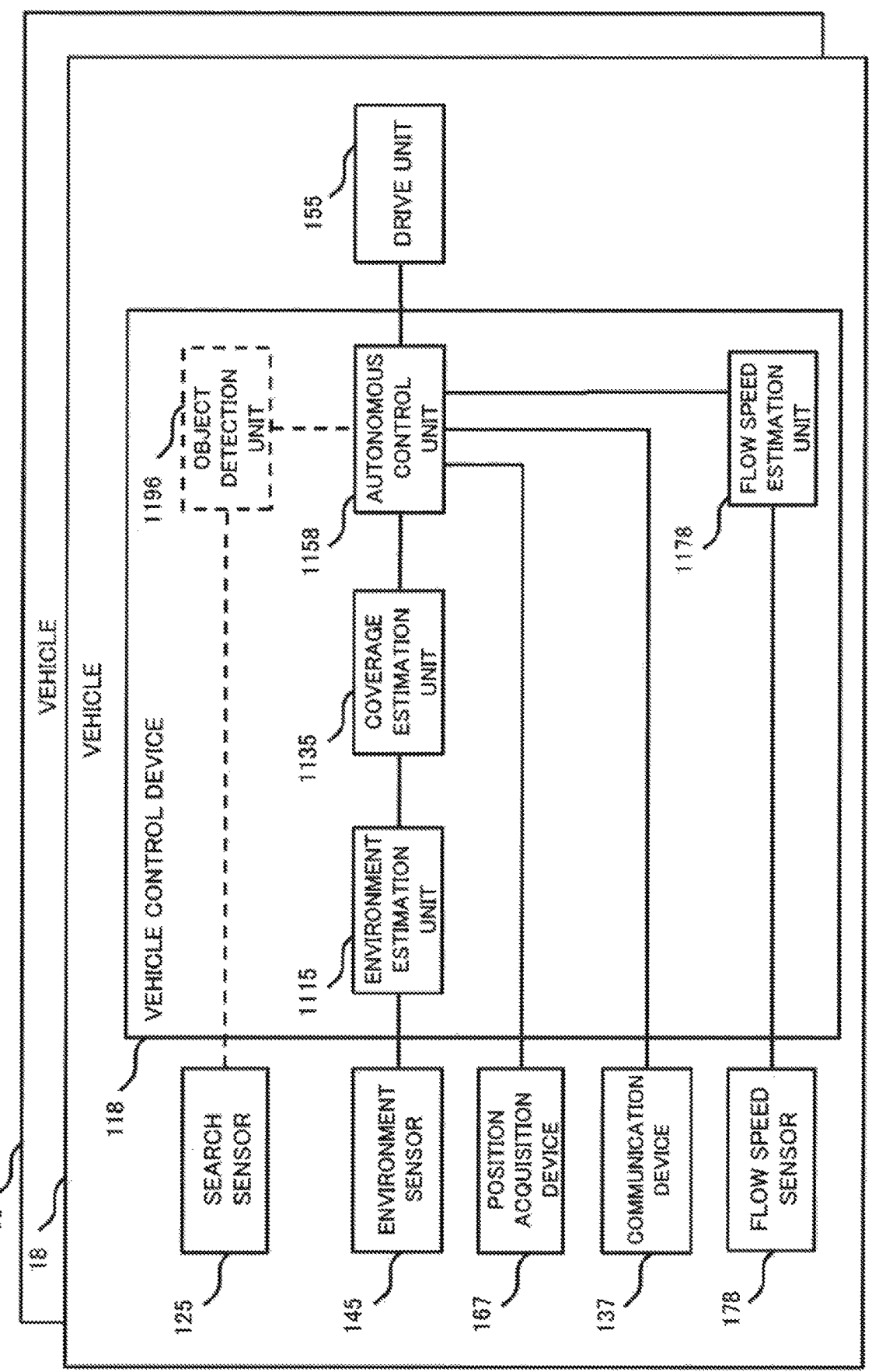
FIG. 20 is a block diagram illustrating one example of a configuration of vehicles in a sixth example embodiment of the present invention.

FIG. 20 is a block diagram illustrating one example of a configuration of vehicles in the sixth example embodiment of the present invention.

Each of one or more vehicles 18 includes search sensor 125, environment sensor 145, drive unit 155, vehicle control device 118, position acquisition device 167, communication device 137, and flow speed sensor 178.

Vehicle control device 118 includes environment estimation unit 1115, coverage estimation unit 1135, autonomous control unit 1158, and flow speed estimation unit 1178. Vehicle control device 118 may further include object detection unit 1196.

Flow speed sensor 178 detects a flow speed of fluid around the own vehicle.

Flow speed estimation unit 1178 estimates a flow speed distribution model in a search region, and a region through which a vehicle passes when moving toward a search region, based on data representing a flow speed detected by flow speed sensor 178. An estimation method of a flow speed distribution model is, for example, as described in the second example embodiment of the present invention.

Based on a flow speed distribution model estimated by flow speed estimation unit 1178, autonomous control unit 1158 estimates a movement time required for movement for each vehicle 18 to move from a current position to each candidate destination. An estimation method of a movement time is, for example, as described in the second example embodiment of the present invention.

Other configurations in the present example embodiment are the same as the configurations in the fifth example embodiment.

As described above, in vehicle control device 118 according to the present example embodiment, autonomous control unit 1158 estimates a movement time from each vehicle to each candidate destination, based on a flow speed distribution model estimated by flow speed estimation unit 1178. Therefore, in addition to the advantageous effect in the fifth example embodiment, vehicle control device 118 according to the present example embodiment has an advantageous effect that calculation accuracy of search efficiency is higher.

Figure 21:
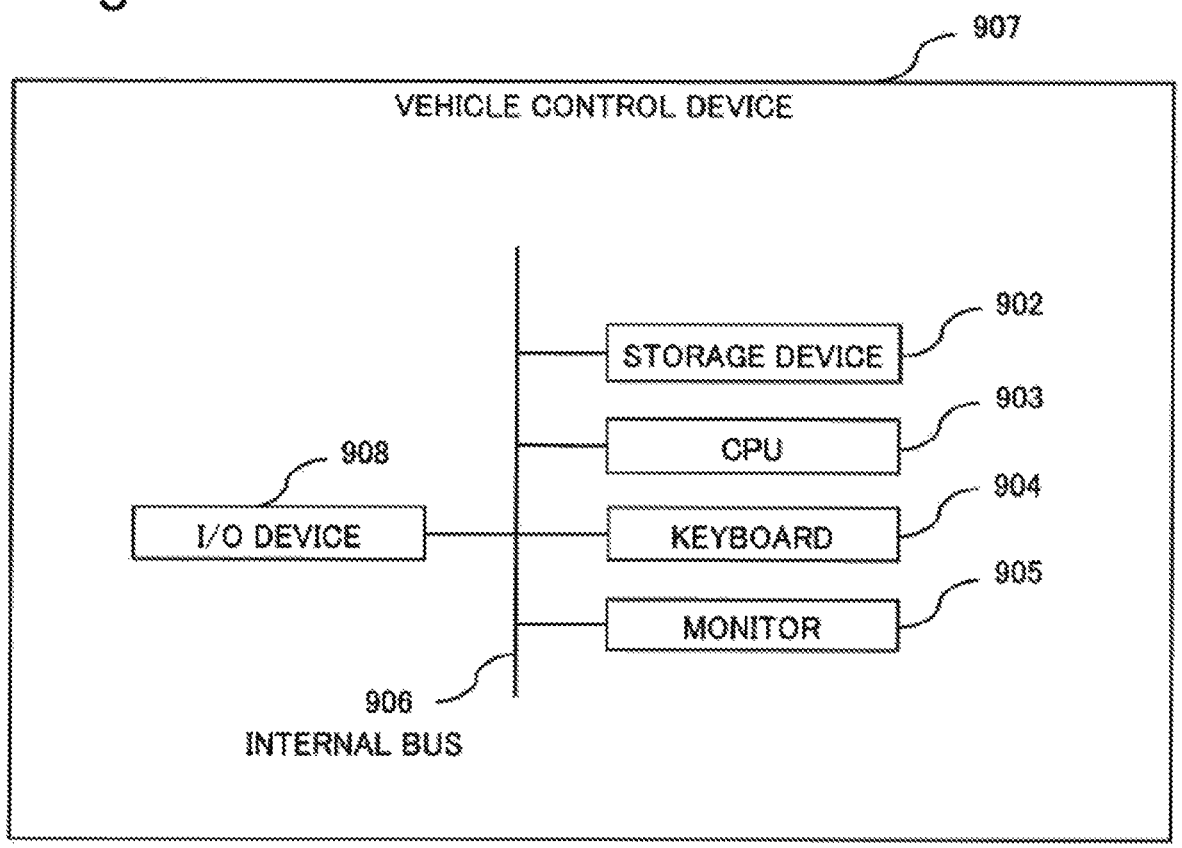
FIG. 21 is a block diagram illustrating one example of a hardware configuration being capable of implementing the vehicle control device in each example embodiment of the present invention.

FIG. 21 is a block diagram illustrating one example of a hardware configuration being capable of implementing the vehicle control device in each example embodiment of the present invention.

Vehicle control device 907 includes storage device 902, central processing unit (CPU) 903, keyboard 904, monitor 905, and input/output (I/O) device 908, and these components are connected by internal bus 906. Storage device 902 stores an operation program of CPU 903 of autonomous control unit 1155 or the like. CPU 903 controls the entire vehicle control device 907, executes an operation program stored in storage device 902, and performs, via I/O device 908, execution of a program of autonomous control unit 1155 or the like and transmission and reception of data. Note that the above-described internal configuration of vehicle control device 907 is one example. As needed, vehicle control device 907 may have a device configuration connecting keyboard 904 and monitor 905.

The above-described vehicle control device in each example embodiment of the present invention may be implemented by a dedicated device, but can also be implemented by a computer (information processing device), except for an operation of hardware in which I/O device 908 executes communication with outside. In each example embodiment of the present invention, I/O device 908 is, for example, an input/output unit from/to search sensor 125, environment sensor 145, drive unit 155, position acquisition device 167, communication device 137, and flow speed sensor 178. In this case, the computer reads, into CPU 903, a software program stored in storage device 902, and executes the read software program in CPU 903. In a case of each of the above-described example embodiments, the software program has only to have a description being capable of implementing a function of each unit of each of the above-described vehicle control devices illustrated in FIG. 1, 6, 8, 12, 15, or 20. However, it is also assumed that each of the units appropriately includes hardware. Then, in such a case, it can be considered that the software program (computer program) constitutes the present invention. Further, it can be considered that a computer-readable non-transitory storage medium storing the software program also constitutes the present invention.

The present invention has been exemplarily described above by each of the above-described example embodiments and a modification example thereof. However, the technical scope of the present invention is not limited to the scope described in each of the above-described example embodiments and the modification example thereof. It is obvious to those skilled in the art that various changes or improvements can be made to the example embodiments. In such a case, a new example embodiment to which the changes or improvements are made can also fall within the technical scope of the present invention. Then, this is obvious from matters described in claims.

Some or all of the above-described example embodiments may be described as, but are not limited to, the following supplementary notes.

(Supplementary Note 1)

A vehicle control device comprising:

environment estimation means for estimating an environment model relating to a search region, based on environment information acquired by an environment sensor, wherein the environment sensor acquires the environment information representing an environment around a local vehicle among one or more vehicles, and the environment sensor is provided in the local vehicle;

coverage estimation means for estimating an effective range based on the environment model estimated by the environment estimation means, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor provided in each vehicle of the one or more vehicles; and autonomous control means for configuring a plurality of sets being configurable by the candidate destinations, which are different from one another, of all the vehicles, determining, based on the effective range estimated by the coverage estimation means, a certain set, among the plurality of sets, by which an entire size demarcated by the effective range of the search sensor in one set among the plurality of sets becomes maximum, determining a destination of the local vehicle, based on the certain set, and instructing, on the determined destination, a drive unit being provided in the local vehicle and achieving movement of the local vehicle.

(Supplementary Note 2)

The vehicle control device according to supplementary note 1, further comprising object detection means for calculating, based on a detection result by the search sensor, an existence probability of the object in each partial region being included in the search region and having a predetermined size, wherein the autonomous control means calculates a first sum of entropy being calculated by the object detection means and relating to the existence probability of the object in each of the partial regions, in the effective range provided when each of the vehicles moves to each of the candidate destinations, and the autonomous control means configures the plurality of sets being configurable by the candidate destinations, which are different from one another, of all the vehicles, calculates a second sum in one set among the plurality of sets of the first sum, determines a certain set, among the plurality of sets, by which the second sum becomes maximum, and determines the destination of the local vehicle, based on the certain set.

(Supplementary Note 3)

The vehicle control device according to supplementary note 1 or 2, wherein the coverage estimation means includes sensor performance storage means for holding performance information relating to performance of the search sensor provided in each of the vehicles, and estimates the effective range, when each of the vehicles moves to each of the candidate destinations, in the search region of the search sensor, based on the environment model estimated by the environment estimation means, and the performance information acquired from the sensor performance storage means.

(Supplementary Note 4)

The vehicle control device according to supplementary note 1, wherein the autonomous control means acquires the position information of the local vehicle, by a position acquisition device which is provided in the local vehicle, and which acquires position information indicating a current position of the local vehicle, transmits the position information of the local vehicle to the another vehicle, and receives the position information of the another vehicle from the another vehicle, by a communication device provided in the local vehicle, estimates a movement time required for each of the vehicles to move to each of the candidate destinations, based on the position information of the local vehicle being acquired by the position acquisition device, or the position information of the another vehicle being received from the another vehicle by the communication device, calculates, based on the effective range estimated by the coverage estimation means, search efficiency acquired by dividing a size of the effective range in the search sensor of the vehicle, when each of the vehicles moves to each of the candidate destinations, by the movement time required for the vehicle to move to the candidate destination, and configures the plurality of sets being configurable by the candidate destinations, which are different from one another, of all the vehicles, determines a certain set, among the plurality of sets, by which a third sum of the search efficiency in one set among the plurality of sets becomes maximum, and determines the destination of the local vehicle, based on the certain set.

(Supplementary Note 5)

The vehicle control device according to supplementary note 2, wherein the autonomous control means acquires the position information of the local vehicle, by a position acquisition device which is provided in the local vehicle, and which acquires position information indicating a current position of the local vehicle, transmits the position information of the local vehicle to the another vehicle, and receives the position information of the another vehicle from the another vehicle, by a communication device provided in the local vehicle, estimates a movement time required for each of the vehicles to move to each of the candidate destinations, based on the position information of the local vehicle being acquired by the position acquisition device, or the position information of the another vehicle being received from the another vehicle by the communication device, calculates the first sum of the entropy calculated by the object detection means, when each of the vehicles moves to each of the candidate destinations, in the effective range, and calculates search efficiency acquired by dividing the first sum by the movement time required for the vehicle to move to the candidate destination, and configures the plurality of sets being configurable by the candidate destinations, which are different from one another, of all the vehicles, determines a certain set, among the plurality of sets, by which a third sum of the search efficiency in one set among the plurality of sets becomes maximum, and determines the destination of the local vehicle, based on the certain set.

(Supplementary Note 6)

The vehicle control device according to supplementary note 5, further comprising flow speed estimation means for estimating, based on a flow speed detected by a flow speed sensor being provided in the local vehicle and detecting the flow speed of fluid around the local vehicle, a flow speed distribution model in the search region, and a region through which each of the vehicles passes when moving toward the search region, wherein the autonomous control means estimates the movement time required for each of the vehicles to move to each of the candidate destinations, based on a flow speed distribution model estimated by the flow speed estimation means.

(Supplementary note 7)

The vehicle control device according to any one of supplementary notes 1 to 6, wherein the environment estimation means includes environment model storage means for holding environment model information used for estimating the environment information in the search region, for the environment information at a certain position, and estimates the environment model in the search region, based on the environment model information acquired from the environment model storage means, and the environment information acquired from the environment sensor.

(Supplementary note 8)

The vehicle control device according to any one of supplementary notes 1 to 7, wherein the vehicle is an underwater vehicle, the search sensor is a sonar, the environment sensor is a sensor which measures a sound speed around the local vehicle, as the environment information, and the environment estimation means estimates the environment model relating to a sound speed distribution in the search region, based on the sound speed measured by the environment sensor.

(Supplementary note 9)

A control method of a vehicle, comprising:

estimating an environment model relating to a search region, based on environment information acquired by an environment sensor, wherein the environment sensor acquires the environment information representing an environment around a local vehicle among one or more vehicles, and the environment sensor is provided in the local vehicle;

estimating an effective range based on the estimated environment model, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor provided in each vehicle of the one or more vehicles; and configuring a plurality of sets being configurable by the candidate destinations, which are different from one another, of all the vehicles, determining, based on the estimated effective range, a certain set, among the plurality of sets, by which an entire size demarcated by the effective range of the search sensor in one set among the plurality of sets becomes maximum, determining a destination of the local vehicle, based on the certain set, and instructing, on the determined destination, a drive unit being provided in the local vehicle and achieving movement of the local vehicle.

(Supplementary note 10)

A non-transitory storage medium storing a control program of a vehicle control device, the control program causing a computer provided in a vehicle control device controlling an operation of a local vehicle among one or more vehicles to execute:

environment estimation processing of estimating an environment model relating to a search region, based on environment information acquired by an environment sensor, wherein the environment sensor acquires the environment information representing an environment around the local vehicle, and the environment sensor is provided in the local vehicle;

coverage estimation processing of estimating an effective range based on the environment model estimated by the environment estimation processing, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor provided in each vehicle of the one or more vehicles; and autonomous control processing of configuring a plurality of sets being configurable by the candidate destinations, which are different from one another, of all the vehicles, determining, based on the effective range estimated by the coverage estimation processing, a certain set, among the plurality of sets, by which an entire size demarcated by the effective range of the search sensor in one set among the plurality of sets becomes maximum, determining a destination of the local vehicle, based on the certain set, and instructing, on the determined destination, a drive unit being provided in the local vehicle and achieving movement of the local vehicle.

(Supplementary note 11)

A vehicle comprising the vehicle control device according to any one of supplementary notes 1 to 8.

(Supplementary note 12)

A vehicle control system comprising two or more of the vehicles according to supplementary note 11.

This application is based upon and claims the benefit of priority from Japanese Patent Application No. 2016-246187, filed on Dec. 20, 2016, the disclosure of which is incorporated herein in its entirety by reference.

INDUSTRIAL APPLICABILITY

The present invention is available for a purpose of disposing a sensor, when sensing is performed by use of one or more sensors, such as a sonar, a radar, and a camera being easily affected by a surrounding environment, in a natural environment such as a submarine, marine, land, or atmospheric environment.

REFERENCE SIGNS LIST

10 Vehicle
110 Vehicle control device
120 Search sensor
130 Communication device
140 Environment sensor
1110 Environment estimation unit
1120 Environment model database
1130 Coverage estimation unit
1140 Sensor performance database
1150 Autonomous control unit
150 Drive unit
20 Vehicle
210 Vehicle control device
220 Search sonar
230 Temperature sensor
240 Water pressure sensor
250 Electric conductivity sensor
260 Underwater communication device
270 Tide sensor
280 Drive unit
2001 Candidate destination
2002 Object detection information
2003 Partial region
2004 Effective range
2005 Movement time
2110 Object detection unit
2120 Sound speed distribution database
2130 Sound speed distribution estimation unit
2140 Sound wave propagation estimation unit
2150 Coverage estimation unit
2160 Autonomous control unit
2170 Control signal generation unit
2180 Search sonar performance database
2190 Tide distribution database
2200 Tide distribution estimation unit
15, 16, 17 Vehicle
125 Search sensor
145 Environment sensor
155 Drive unit
137 Communication device
167 Position acquisition device
115, 116, 117 Vehicle control device
1115 Environment estimation unit
1135 Coverage estimation unit
1155, 1156, 1157 Autonomous control unit
1196 Object detection unit
902 Storage device
903 CPU
904 Keyboard
905 Monitor
906 Internal bus
907 Vehicle control device
908 I/O device

What is claimed is:

1. A vehicle control device comprising:

an environment estimation unit that estimates an environment model relating to a search region, based on environment information acquired by an environment sensor, wherein the environment sensor acquires the environment information representing an environment around a local vehicle among one or more vehicles, and the environment sensor is provided in the local vehicle;

a coverage estimation unit that estimates an effective range based on the environment model estimated by the environment estimation unit, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor provided in each vehicle of the one or more vehicles; and an autonomous control unit that configures a plurality of sets being configurable by the candidate destinations, which are different from one another, of all the vehicles, determines, based on the effective range estimated by the coverage estimation unit, a certain set, among the plurality of sets, by which an entire size demarcated by the effective range of the search sensor in one set among the plurality of sets becomes maximum, determines a destination of the local vehicle, based on the certain set, and instructs, on the determined destination, a drive unit being provided in the local vehicle and achieves movement of the local vehicle.

2. The vehicle control device according to claim 1, further comprising an object detection unit that calculates, based on a detection result by the search sensor, an existence probability of the object in each partial region being included in the search region and has a predetermined size, wherein the autonomous control unit calculates a first sum of entropy being calculated by the object detection unit and relating to the existence probability of the object in each of the partial regions, in the effective range provided when each of the vehicles moves to each of the candidate destinations, and the autonomous control means configures the plurality of sets being configurable by the candidate destinations, which are different from one another, of all the vehicles, calculates a second sum in one set among the plurality of sets of the first sum, determines a certain set, among the plurality of sets, by which the second sum becomes maximum, and determines the destination of the local vehicle, based on the certain set.

3. The vehicle control device according to claim 2, wherein the autonomous control unit acquires the position information of the local vehicle, by a position acquisition device which is provided in the local vehicle, and which acquires position information indicating a current position of the local vehicle, transmits the position information of the local vehicle to the another vehicle, and receives the position information of the another vehicle from the another vehicle, by a communication device provided in the local vehicle, estimates a movement time required for each of the vehicles to move to each of the candidate destinations, based on the position information of the local vehicle being acquired by the position acquisition device, or the position information of the another vehicle being received from the another vehicle by the communication device, calculates the first sum of the entropy calculated by the object detection unit, when each of the vehicles moves to each of the candidate destinations, in the effective range, and calculates search efficiency acquired by dividing the first sum by the movement time required for the vehicle to move to the candidate destination, and configures the plurality of sets being configurable by the candidate destinations, which are different from one another, of all the vehicles, determines a certain set, among the plurality of sets, by which a third sum of the search efficiency in one set among the plurality of sets becomes maximum, and determines the destination of the local vehicle, based on the certain set.

4. The vehicle control device according to claim 3, further comprising low speed estimation unit that estimates, based on a flow speed detected by a flow speed sensor being provided in the local vehicle and detecting the flow speed of fluid around the local vehicle, a flow speed distribution model in the search region, and a region through which each of the vehicles passes when moving toward the search region, wherein the autonomous control unit estimates the movement time required for each of the vehicles to move to each of the candidate destinations, based on a flow speed distribution model estimated by the flow speed estimation unit.

5. The vehicle control device according to claim 4, wherein the environment estimation unit includes environment model storage unit that holds environment model information used for estimating the environment information in the search region, for the environment information at a certain position, and estimates the environment model in the search region, based on the environment model information acquired from the environment model storage unit, and the environment information acquired from the environment sensor.

6. The vehicle control device according to claim 3, wherein the environment estimation unit includes environment model storage unit that holds environment model information used for estimating the environment information in the search region, for the environment information at a certain position, and estimates the environment model in the search region, based on the environment model information acquired from the environment model storage unit, and the environment information acquired from the environment sensor.

7. The vehicle control device according to claim 2, wherein the coverage estimation unit includes sensor performance storage unit that holds performance information relating to performance of the search sensor provided in each of the vehicles, and estimates the effective range, when each of the vehicles moves to each of the candidate destinations, in the search region of the search sensor, based on the environment model estimated by the environment estimation unit, and the performance information acquired from the sensor performance storage unit.

8. The vehicle control device according to claim 7, wherein the environment estimation unit includes environment model storage unit that holds environment model information used for estimating the environment information in the search region, for the environment information at a certain position, and estimates the environment model in the search region, based on the environment model information acquired from the environment model storage unit, and the environment information acquired from the environment sensor.

9. The vehicle control device according to claim 2, wherein the environment estimation unit includes environment model storage unit that holds environment model information used for estimating the environment information in the search region, for the environment information at a certain position, and estimates the environment model in the search region, based on the environment model information acquired from the environment model storage unit, and the environment information acquired from the environment sensor.

10. The vehicle control device according to claim 2, wherein the vehicle is an underwater vehicle, the search sensor is a sonar, the environment sensor is a sensor which measures a sound speed around the local vehicle, as the environment information, and the environment estimation unit estimates the environment model relating to a sound speed distribution in the search region, based on the sound speed measured by the environment sensor.

11. The vehicle control device according to claim 1, wherein
the coverage estimation unit
includes sensor performance storage unit that holds performance information relating to performance of the search sensor provided in each of the vehicles, and
estimates the effective range, when each of the vehicles moves to each of the candidate destinations, in the search region of the search sensor, based on the environment model estimated by the environment estimation unit, and the performance information acquired from the sensor performance storage unit.

12. The vehicle control device according to claim 11, wherein
the environment estimation unit
includes environment model storage unit that holds environment model information used for estimating the environment information in the search region, for the environment information at a certain position, and
estimates the environment model in the search region, based on the environment model information acquired from the environment model storage unit, and the environment information acquired from the environment sensor.

13. The vehicle control device according to claim 11, wherein
the vehicle is an underwater vehicle,
the search sensor is a sonar,
the environment sensor is a sensor which measures a sound speed around the local vehicle, as the environment information, and
the environment estimation unit estimates the environment model relating to a sound speed distribution in the search region, based on the sound speed measured by the environment sensor.

14. The vehicle control device according to claim 1, wherein
the autonomous control men unit
acquires the position information of the local vehicle, by a position acquisition device which is provided in the local vehicle, and which acquires position information indicating a current position of the local vehicle,
transmits the position information of the local vehicle to the another vehicle, and receives the position information of the another vehicle from the another vehicle, by a communication device provided in the local vehicle,
estimates a movement time required for each of the vehicles to move to each of the candidate destinations, based on the position information of the local vehicle being acquired by the position acquisition device, or the position information of the another vehicle being received from the another vehicle by the communication device,
calculates, based on the effective range estimated by the coverage estimation unit, search efficiency acquired by dividing a size of the effective range in the search sensor of the vehicle, when each of the vehicles moves to each of the candidate destinations, by the movement time required for the vehicle to move to the candidate destination, and
configures the plurality of sets being configurable by the candidate destinations, which are different from one another, of all the vehicles, determines a certain set, among the plurality of sets, by which a third sum of the search efficiency in one set among the plurality of sets becomes maximum, and determines the destination of the local vehicle, based on the certain set.

15. The vehicle control device according to claim 14, wherein
the environment estimation unit
includes environment model storage unit that holds environment model information used for estimating the environment information in the search region, for the environment information at a certain position, and
estimates the environment model in the search region, based on the environment model information acquired from the environment model storage unit, and the environment information acquired from the environment sensor.

16. The vehicle control device according to claim 14, wherein
the vehicle is an underwater vehicle,
the search sensor is a sonar,
the environment sensor is a sensor which measures a sound speed around the local vehicle, as the environment information, and
the environment estimation unit estimates the environment model relating to a sound speed distribution in the search region, based on the sound speed measured by the environment sensor.

17. The vehicle control device according to claim 1, wherein
the environment estimation unit
includes environment model storage unit that holds environment model information used for estimating the environment information in the search region, for the environment information at a certain position, and
estimates the environment model in the search region, based on the environment model information acquired from the environment model storage unit, and the environment information acquired from the environment sensor.

18. The vehicle control device according to claim 1, wherein
the vehicle is an underwater vehicle,
the search sensor is a sonar,
the environment sensor is a sensor which measures a sound speed around the local vehicle, as the environment information, and
the environment estimation unit estimates the environment model relating to a sound speed distribution in the search region, based on the sound speed measured by the environment sensor.

19. A control method of a vehicle, comprising:
estimating an environment model relating to a search region, based on environment information acquired by an environment sensor, wherein the environment sensor acquires the environment information representing an environment around a local vehicle among one or more vehicles, and the environment sensor is provided in the local vehicle;
estimating an effective range, based on the estimated environment model, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor provided in each vehicle of the one or more vehicles; and configuring a plurality of sets being configurable by the candidate destinations, which are different from one another, of all the vehicles, determining, based on the estimated effective range, a certain set, among the plurality of sets, by which an entire size demarcated by the effective range of the search sensor in one set among the plurality of sets becomes maximum, determining a destination of the local vehicle, based on the certain set, and instructing, on the determined destination, a drive unit being provided in the local vehicle and achieving movement of the local vehicle.

20. A non-transitory storage medium storing a control program of a vehicle control device, the control program causing a computer provided in a vehicle control device controlling an operation of a local vehicle among one or more vehicles to execute:

environment estimation processing of estimating an environment model relating to a search region, based on environment information acquired by an environment sensor, wherein the environment sensor acquires the environment information representing an environment around the local vehicle, and the environment sensor is provided in the local vehicle;

coverage estimation processing of estimating an effective range based on the environment model estimated by the environment estimation processing, when the local vehicle, and each vehicle which is another vehicle being different from the local vehicle and including a same function as the local vehicle among the one or more vehicles move to each predetermined candidate destination, the effective range being in the search region of a search sensor, the search sensor provided for searching for an object existing in the search region and the search sensor provided in each vehicle of the one or more vehicles; and autonomous control processing of configuring a plurality of sets being configurable by the candidate destinations, which are different from one another, of all the vehicles, determining, based on the effective range estimated by the coverage estimation processing, a certain set, among the plurality of sets, by which an entire size demarcated by the effective range of the search sensor in one set among the plurality of sets becomes maximum, determining a destination of the local vehicle, based on the certain set, and instructing, on the determined destination, a drive unit being provided in the local vehicle and achieving movement of the local vehicle.

* * * * *